(12) United States Patent
Sesek et al.

(10) Patent No.: US 7,221,800 B2
(45) Date of Patent: May 22, 2007

(54) DOCUMENT RENDERING WITH SUBSTITUTED MATCHING TEXT

(75) Inventors: Robert Sesek, Meridian, ID (US); Travis J. Parry, Boise, ID (US); Chad A. Stevens, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 845 days.

(21) Appl. No.: 10/652,003

(22) Filed: Aug. 29, 2003

(65) Prior Publication Data

US 2005/0057779 A1 Mar. 17, 2005

(51) Int. Cl.
*G06K 9/72* (2006.01)

(52) U.S. Cl. .................. 382/229; 358/1.9; 358/400; 358/453; 358/462

(58) Field of Classification Search ............ 382/229, 382/172, 168, 275, 176, 163, 169, 270, 173; 358/1.9, 2.99, 1.15, 465, 463, 462, 448, 464, 358/466, 453, 400, 402, 403, 3.22; 434/362; 715/512

See application file for complete search history.

(56) References Cited

U.S. PATENT DOCUMENTS

| | | | | |
|---|---|---|---|---|
| 4,760,606 A | * | 7/1988 | Lesnick et al. | 382/306 |
| 4,918,723 A | * | 4/1990 | Iggulden et al. | 379/100.17 |
| 5,394,482 A | * | 2/1995 | Hadgis | 382/173 |
| 5,448,375 A | * | 9/1995 | Cooper et al. | 358/403 |
| 6,014,450 A | * | 1/2000 | Heilper et al. | 382/101 |
| 6,937,766 B1 | * | 8/2005 | Wilf et al. | 382/229 |
| 2004/0032624 A1 | * | 2/2004 | Stevens et al. | 358/402 |

* cited by examiner

*Primary Examiner*—Sheela Chawan

(57) ABSTRACT

Text that is adjacent to predetermined indicia is detected in a digital image. Alternatively, or in addition, a digital image can have text that is adjacent to a predefined insertion field. Text that is input and/or derived from an optically scanned image is substituted in the digital image for the predetermined indicia and/or for the predefined insertion field. The substituted text matches the font of text adjacent thereto in the digital image. The digital image having the substitution is rendered.

50 Claims, 8 Drawing Sheets

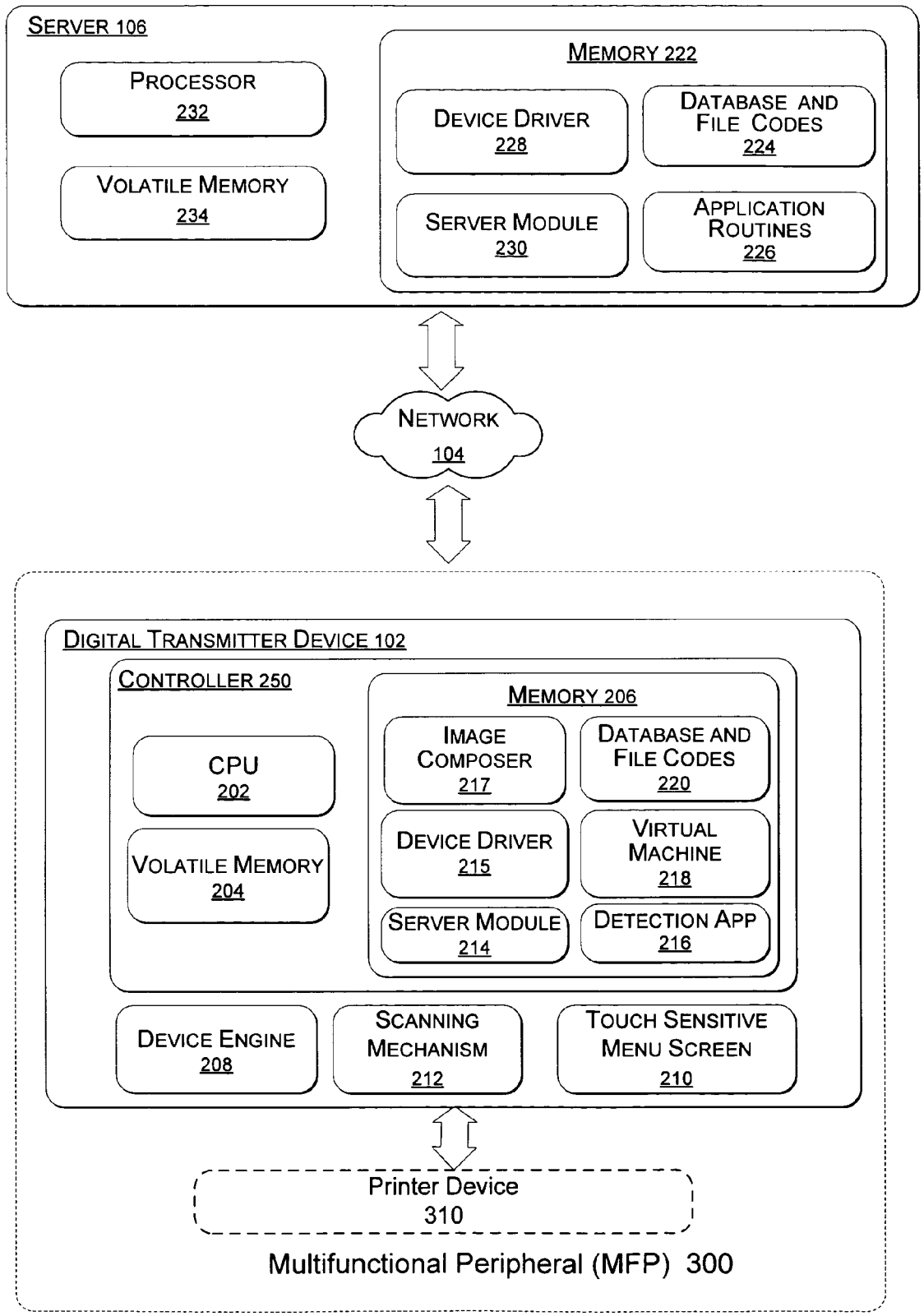

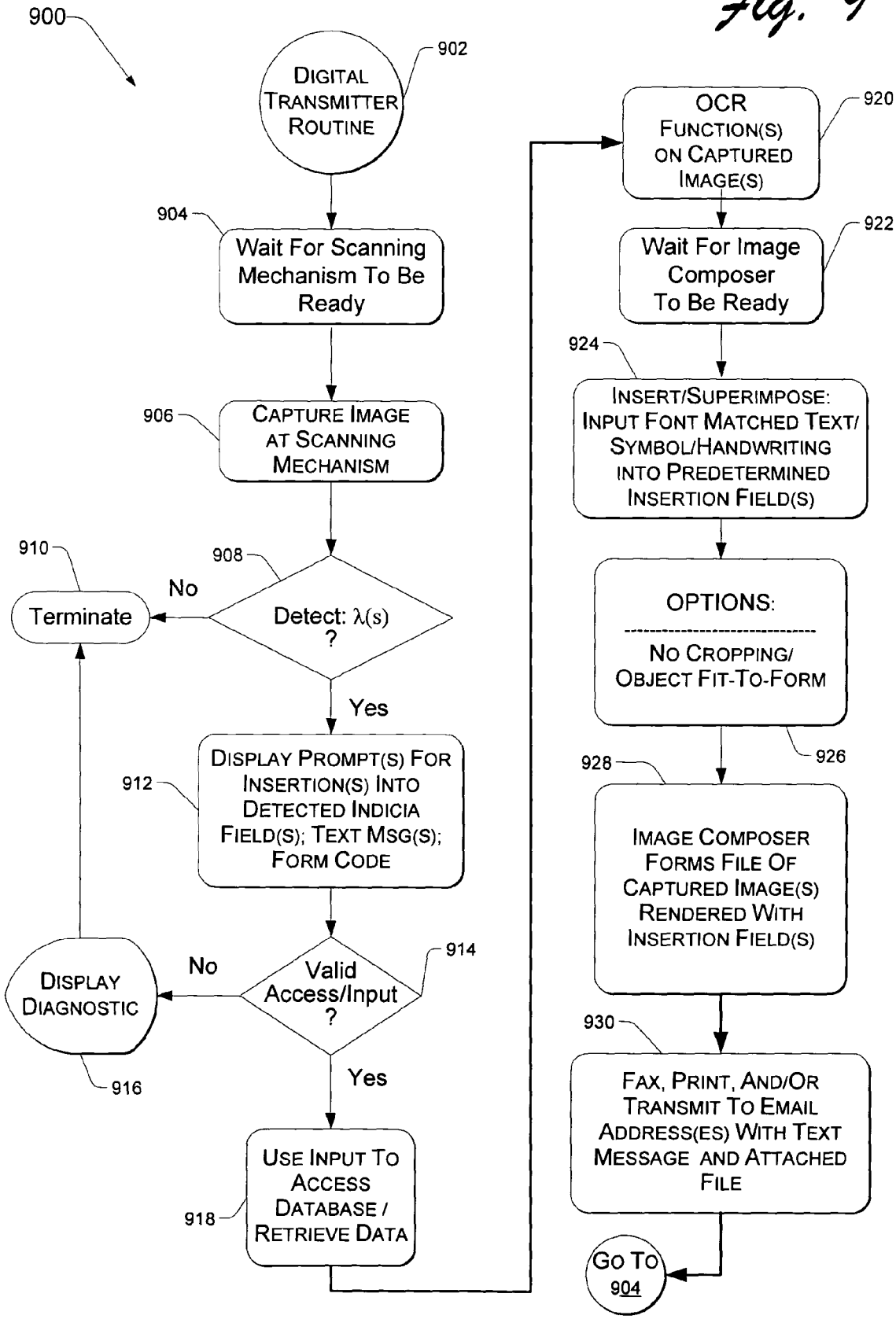

DOCUMENT RENDERING WITH SUBSTITUTED MATCHING TEXT

FIELD OF THE INVENTION

The present invention relates generally to peripheral devices, and more particularly to rendering a document having text with a digital transmitter device that receives matching text that is substituted in the document.

BACKGROUND OF THE INVENTION

Many peripherals to computer networks include a scanner component. One example of such a peripheral is an "All-in-one", also known as a multifunction peripheral (MFP) in that it has the capability to perform the multiple functions of scanning hardcopy documents, copying, and printing. Another example is a digital network copier that scans in documents from an automatic document feeder, does high volume copying, and has the capabilities of binding, collating, folding, stacking, stapling, stitching, edge-trimming, paginating, and printing on substrates of varied composition. Each of these peripherals, when in communication with an interconnecting network, can also be described as being a digital transmitter device. A digital transmitter device typically has an input device (e.g. a keyboard), a display, a scanner, and an output device. The output device of the digital transmitter device can be for sending a facsimile or an electronic mail message (e-mail). A digital transmitter device need not have a printer.

In an exemplary scanning operation, a hardcopy of a document or other physical object can be presented to the scanner portion of a digital transmitter device. After scanning, the digital transmitter device transforms the scanned image into a digital representation. If the digital transmitter device has a printer, the digital representation can be rendered to the printer to produce one or more hardcopies. If the digital transmitter device has facsimile transmission capabilities and a network over which to transmit a facsimile, the digital transmitter device can render the digital representation of the scanned image into a facsimile image that can be transmitted over the network to a predetermined or input facsimile telephone number.

In an exemplary digital transmitting operation, a hardcopy of a document or other physical object can be presented to the scanner portion of a digital transmitter device. After scanning, the digital transmitter device transforms the scanned image into a digital representation that is then saved in a data format, such as in a bit map data format or in a Portable Document Format (PDF). Electronic messaging can be used to send an electronic mail (e-mail) message from the digital transmitter device with an attachment of the digitized representation in the data format. The e-mail message can be sent to recipients over an interconnecting network, where the recipients have an e-mail address that a user manually enters at the digital transmitter device or that a user specifies using a predefined list of recipient e-mail addresses that can be stored in a memory of the digital transmitter device.

A hardcopy of a document that is to be scanned may need to be modified so that the resultant scanned document will contain the modifications. For instance, a user may wish to insert a word or a phrase into a paragraph of the hardcopy of the document. To do so, a softcopy of the document is edited using a word processing application such as the WORD® program provided by Microsoft Corporation of Redmond, Wash. When the user edits the softcopy, the user will operate the word processing application so that the text that the user is inserting will have substantially the same font as any adjacent text. Otherwise, the inserted text would be lacking in esthetics. As such, text that the user inserts into a sentence or paragraph will have substantially the same font that of the rest of the sentence or paragraph. Accordingly, the modification will be an esthetic modification. Then, a hardcopy of the edited document is output for further use, such as for scanning.

There is a need for a scanner-based device, such as a digital transmitter device, that provides for an esthetic modification of a document at the scanner-based device without requiring the user to edit a softcopy of the document on another computing device.

SUMMARY OF THE INVENTION

In one implementation, a digital transmitter device optically scans a substrate to form a digital image. An optical character recognition of the digital image forms a document having text in a word processing format that is adjacent to predetermined indicia. Text input is received and substituted for the predetermined indicia in the document such that both the text input and the text adjacent to the predetermined indicia have substantially the same font. A rendering of the document is output.

In another implementation, a document is produced by a digital transmitter device, wherein the document includes a form template that incorporates a scanned image into a predefined insertion field. The form template, or parameters thereof, are stored in or accessible to the digital transmitter device. The form template has a word processing format and includes text that is adjacent to the predefined insertion field. The digital transmitter device scans an image for inclusion in the form template to form a digital image. An optical character recognition of the digital image forms a text input that is substituted in the form template for the predefined insertion field such that both the text input and the text that is adjacent to the predefined insertion field have substantially the same font. A rendering of the document is output.

DESCRIPTION OF THE DRAWINGS

A more complete understanding of various implementations of the present invention may be had by reference to the following detailed description when taken in conjunction with the accompanying drawings wherein the same reference numbers are used throughout the drawings to reference like components and features, and wherein:

FIG. 1b is an example of a user interface, according to an embodiment of the present invention, for a digital transmitter device in FIG. 1a.

FIG. 2 is a block diagram, according to an embodiment of the present invention, illustrating a digital transmitter device in communication through a wired or wireless link to an interconnecting network to which a server is also in communication.

FIGS. 8–9 are flow diagrams depicting respective processes for use in a computing and communication environment having a digital transmitter device as in FIG. 1a, for example, in accordance with exemplary embodiments of the present invention.

DETAILED DESCRIPTION

Figure 1A:
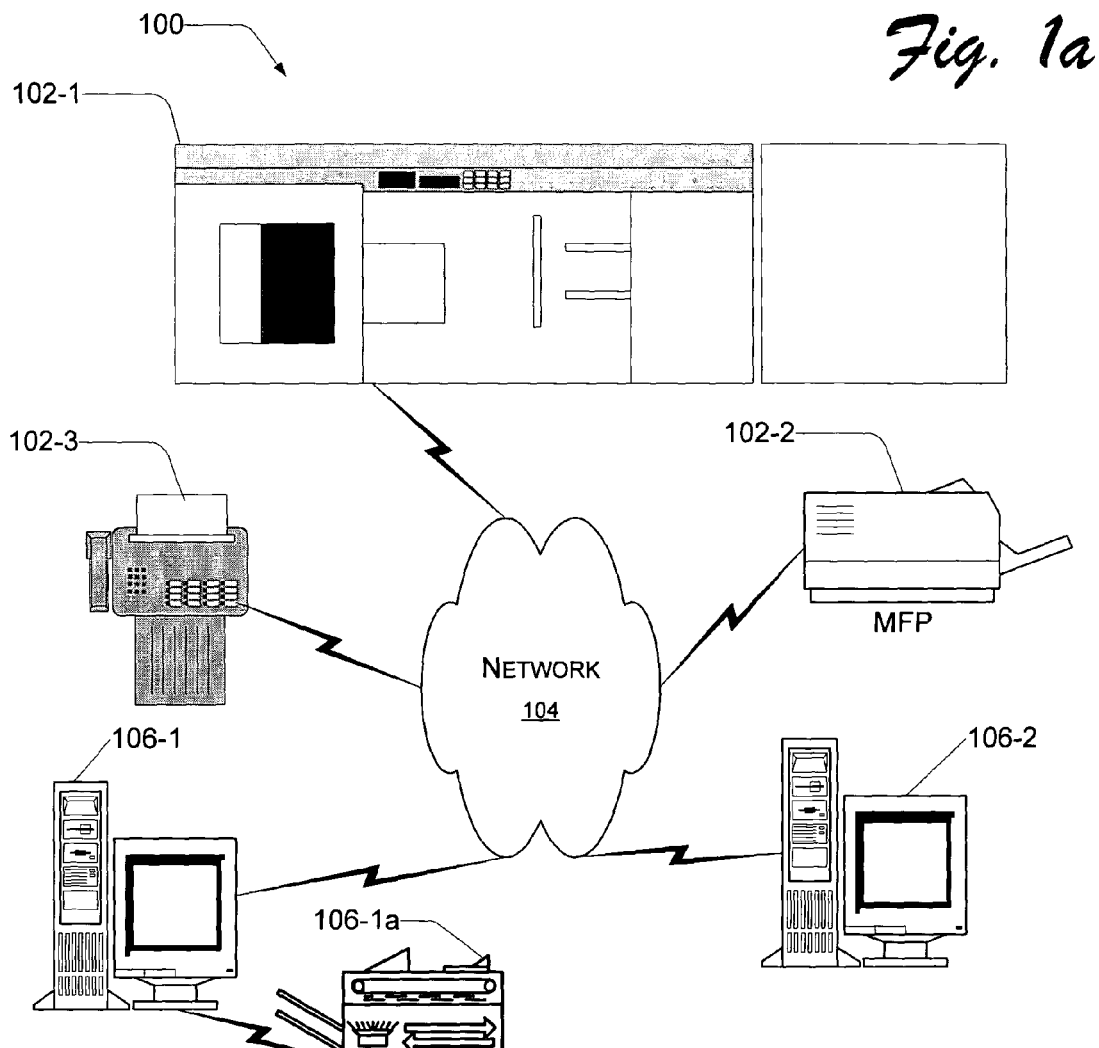
FIG. 1a is a block diagram, according to an embodiment of the present invention, depicting a computing and communication environment having various digital transmitter devices in a system environment suitable for providing local access to the digital transmitter devices.

Implementations described herein provide control of a digital transmitter device based upon user input. The user input corresponds to text that is inserted into a document. The inserted text substantially matches the font of the document. The font-matched text is inserted into the document at one or more predetermined insertion fields without editing the document with a word processor.

In a first implementation, the document is marked up with detectable indicia at one or more predetermined insertion fields where the text is to be inserted. The marked up document is scanned to form an optically scanned image. The detectable indicia is detected in the optically scanned image to ascertain the one or more predetermined insertion fields. The user is prompted at the digital transmitter device to enter the text, or representation(s) thereof, that is to be respectively inserted into the one or more predetermined insertion fields. Alternatively, the text, or representation(s) thereof, can be optically scanned and subjected to optical character recognition routine to form a softcopy of the text that is to be respectively inserted into the one or more predetermined insertion fields. The optically scanned document is subjected to optical character recognition form a softcopy of the document. The text that is to be respectively inserted into the one or more predetermined insertion fields is then substantially font-matched with the respective one or more predetermined insertion fields (or vice a versa) prior to the insertion thereof into the softcopy of the document.

In a second implementation, a form code is communicated to the digital transmitter device. The form code is used by the digital transmitter device to identify a softcopy of a form template that has one or more predetermined insertion fields. The user is prompted to enter the text, or representation(s) thereof, that is to be respectively inserted into the one or more predetermined insertion fields. Alternatively, the text, or representation(s) thereof, can be optically scanned and subjected to optical character recognition routine to form a softcopy of the text that is to be respectively inserted into the one or more predetermined insertion fields. The softcopy of the text that is to be respectively inserted into the one or more predetermined insertion fields is then substantially font-matched with the respective one or more predetermined insertion fields (or vice a versa) prior to the insertion thereof into the softcopy of the form template.

The first implementation relates to the scanning of a hardcopy to produce an optically scanned image at a digital transmitter device. The optically scanned image is subjected to an optical character recognition routine at the digital transmitter device in order to produce a softcopy of the hardcopy. The hardcopy also has certain detectable indicia on its face. This detectable indicia is representative of one or more insertion fields into which text is to be inserted. The optically scanned image is examined for the presence of the detectable indicia corresponding to the one or more insertion fields. Detectable indicia determined to be present is further examined to determine the position, size, and shape of each of the one or more insertion fields. Upon this determination, respective text is located, identified, and/or retrieved for the purpose of fitting the same, respectively, into each of the one or more insertion fields. The text and/or objects are located, identified, and/or retrieved using routines that call for interactive user input and/or retrieval of data from a database based upon interactive user input, such as where the user physically inputs data from a keypad and/or touch screen. The fitting of the text, respectively, into each of the one or more insertion fields includes a routine that substantially matches the font of the inserted text to that of its adjacent text in each of the one or more insertion fields for the softcopy of the document. Once these font-matched text insertions have been made into the softcopy, the softcopy can then be used to produce a modified scanned image. As such, the modified scanned image represents the optically scanned hardcopy having font-matched text inserted into the one or more insertion fields.

The detectable indicia can be quite diverse in type and kind. The type and kind of detectable indicia need only be detectable by a detection routine that is performed upon an optically scanned image. As such, the detectable indicia can be an ink that is visible upon application by a user to a paper document but becomes invisible to the human eye when the ink dries. Nevertheless, the dry ink is still detectable by the detection routine that is performed upon the optically scanned image. Invisible ink may be selected as the desirable detectable indicia in that the original paper document is not obscured by a user's markings. The dry ink, when invisible to the human eye, can be detected when it exhibits a predetermined range of reflectance values or exhibits an inherent reflectivity property (e.g., one or more wavelengths, $\lambda$) that can be found by the detection routine performed upon the optically scanned image. The reflective property of the ink can be understood as a particular hue or color that is found within the optically scanned image by the detection routine. The dry ink, in another example, may only be visible to the human eye when illuminated by a certain color of light, such as a blue-violet light. As such, the dry ink would only be detectable when illuminated by light of one or more predetermined ranges of wavelengths.

Alternatively, the detectable indicia can be a bar code or other patterned indicia that can be detected within the optically scanned image by the detection routine. Other detectable indicia are also contemplated, any of which can be found by known detection routines performed upon an optically scanned image.

As described above, the detectable indicia is representative of one or more insertion fields into which text is to be inserted. The detection routine, once having determined the presence of detectable indicia in the optically scanned image, will use the detected presence to determine various characteristics, respectively, of the one or more insertion fields. These characteristics can include the number, location, size, and shape of the one or more insertions fields. For example, a user can apply sticky bar code labels of different types to a piece of paper that is to be scanned. Alternatively, the user can also edit a softcopy of the document so as to include images of the bar codes or like detectable indicia.

The types of bar codes placed on the hardcopy, or its corresponding softcopy, by the user can have respectively different significance in subsequent processing. A particular bar code that is detected by a detection routine may be interpreted as an instruction to prompt a user to input a code at a user interface of the digital transmitter device. For instance, the prompt may direct the user to physically input text from a keypad and/or touch screen. Alternatively, the input code might be used to look up text that is to be fit as a substitution for the detectable indicia into the corresponding insertion field. The input code may also be used to ascertain a predetermined shape and size of the insertion field. As a further alternative, one or more other input codes might be used to retrieve a particular e-mail address distribution list from a particular database so that an e-mail message can be addressed to each of the e-mail addresses along with an attached file containing the optically scanned image as modified by the inserted text and objects.

A different bar code that is detected by a detection routine may be interpreted as an instruction to prompt a user to make a handwritten mark using a stylus on a touch sensitive menu screen of a user interface with the digital transmitter device. The handwritten mark can be processed in a variety of ways. For instance, the handwritten mark can be subjected to an optical character recognition routine so that a softcopy thereof can be formed. This softcopy can then be substantially font-matched to text in the softcopy of a document into which the handwriting is to be inserted into an insertion field.

A handwritten mark input by a user can be processed by fitting of the same into an insertion field of predetermined size and font at the location of a bar code in the optically scanned image. The optically scanned image can be modified so as to show the handwritten mark, such as by obscuring the document beneath the handwritten mark or by watermarking the handwritten mark so that it does not obscure the document beneath the handwritten mark—depending upon which bar code the user applied to the hardcopy.

In addition to or as an alternative to bar codes, a user can make marks or symbols on the hardcopy that is to be scanned, such as with one or more types of non-human visible inks such as the invisible ink described above. For instance, each ink can exhibit different inherent reflectivity properties (e.g., a different wavelength—$\lambda$), each having a significance similar to that of the different bar codes.

The different bar codes and markings, as described above, can represent different shapes and sizes of insertion fields. For instance, a user may use ink to mark a periphery of an insertion field, or the user can make a mark on the hardcopy for which the periphery of an insertion field is predetermined. For instance, the mark "x" may be an indicator for an insertion field having a shape that is any of: a circle having a one (1) inch radius, a two (2) inch square, an ellipse having two foci separated by one (1) inch, etc. Two dots made by a user on a paper document may be interpreted by a detection routine as indicating, respectively, the upper left and lower right corners of a rectangular insertion field. The type, shape, and size of markings that correspond to insertion fields of various shapes, sizes, and positions are not limited by the examples given herein.

Upon detection of the detectable indicia corresponding to each insertion field and the shape, size, and position thereof, (e.g., invisible ink, bar code, or other significant mark), the detection routine can also determine what is to be inserted into each insertion field. For instance, the detection of ink having a specific reflective property may be recognized as a cue to prompt the user for input. After the user has responded with input to the prompt, the optically scanned image would then be modified to fit the user's input into the size, shape and position of the insertion field so as to create a modified scanned image. The modified scanned image can then be rendered as a hardcopy upon which the user's input is seen. Other output renderings are also contemplated.

The user can physically mark one or more fields, such as by application of ink or by perforations, on paper or another substrate that is to be optically scanned. The shapes of the physical marks made by the user, and the types of ink used by the user, can have respectively different significances in subsequent processing by various detection routines. A particular mark that is detected by a detection routine may be interpreted as an instruction to prompt a user to input a code at a user interface of the digital transmitter device, such as by using a keypad and/or touch sensitive menu screen. This input code can then be used to look up text that is to be fit into an insertion field of predetermined size at the location of the particular mark. This or another input code might be used for the retrieval of a distribution list of e-mail addresses from a particular database so that respective e-mail messages can be addressed for the transmission thereto of the modified scanned image. A different mark that is detected by a detection routine may be interpreted as an instruction to prompt a user to make a handwritten mark using a stylus on a touch sensitive menu screen of a user interface. The handwritten mark can be processed in a variety of ways, as described herein.

The second implementation produces a document with a digital transmitter device. The document is based on a softcopy of a form template that is a text document having a predefined insertion field. The form template, or parameters thereof, is stored in or accessible to the digital transmitter device. An image is scanned to form an optically scanned image thereof. This optically scanned image is subjected to an optical character recognition routine to form a softcopy of text that is located in the optically scanned image. Alternatively, the text softcopy of the text that is to be inserted into the form template can be obtained by a user directly keying in the text at a keyboard or other input device of the digital transmitter device. Other ways can be used to obtain a softcopy of text that is to be inserted into the form template. In either case, once the softcopy of the text to be inserted is obtained, the font thereof can be substantially matched as to the font of text adjacent to the predefined insertion field in the softcopy of the form template, or vice a versa. The font-matched text can then be inserted into the softcopy of the form template.

In the first or the second implementation, once text is inserted into corresponding predetermined insertion fields, the resultant modified scanned image can be rendered as a hardcopy to a printer. In an alternative implementation, a user can be prompted at the digital transmitter device to input a code that is used to look up one or more e-mail addresses or facsimile telephone numbers to which the modified scanned image is to be transmitted. The modified scanned image can then be transmitted by e-mail or by facsimile to a facsimile telephone number, or it can then be rendered as a hardcopy to a printer or any combination of the forgoing.

A network message can be transmitted so as to include the modified scanned image in a transmission of message data via an e-mail message from the digital transmitter device to one or more e-mail address(es). When an e-mail message is sent from a digital transmitter device, message data including the modified scanned image can be attached to the e-mail message.

The e-mail message is sent from the digital transmitter device to an electronic address including an address of a network resource and a destination location thereat. The modified scanned image in the message data can be composed from the digitized image that was captured by the scanning mechanism, which digital image was modified by any insertion fields as described above. The e-mail address (es) can be anyone of an electronic mail (e-mail) address at an e-mail server on a network, a file folder address at a server on a network, a Web site address at a server on a network, and the like.

The digitizing of the composition process for the message data can include handwriting, or other indicia, that was captured from a user's use of an input device, such as a touch sensitive menu screen, a keyboard, etc. One result of the composition or digitizing process is that the input from the input device (e.g., handwriting received at a touch sensitive menu screen) can be superimposed on, around, or near the image that has been composed or digitized. As such, the resultant appearance of the rendered documents sent in the e-mail message will be that the handwriting, or other indicia, appears to be integral to or a part of the original images on the documents that were captured by the scanning mechanism.

Exemplary System for Configuration of a Digital Transmitter Device

FIG. 1a illustrates an example of a system environment 100 suitable for implementing an embodiment of the present invention. The system environment 100 contemplates a plurality of digital transmitter devices 102-i (e.g., 102-1, 102-2, etc.) that can be in communication with an interconnected network 104. Interconnected network 104 is in communication with one or more server(s) 106-i. Each server 106-i can be an e-mail message server that serves one or more e-mail addresses to which any digital transmitter device 102 can send an e-mail message. Digital transmitter devices 102-i may be stand-alone devices that have a scanning mechanism, and may also have an output mechanism such as a printer, a copier or a fax machine. As such, each digital transmitter devices 102-i is a multifunction peripheral (MFP) device that combines the scanning mechanism and the output mechanism into a single device. A digital transmitter device 102-i can function while uncoupled or isolated from other devices. A digital transmitter device 102-i therefore can be a device such as a copier, a scanner, or a fax machine such as are shown in FIG. 1a.

Figure 1B:
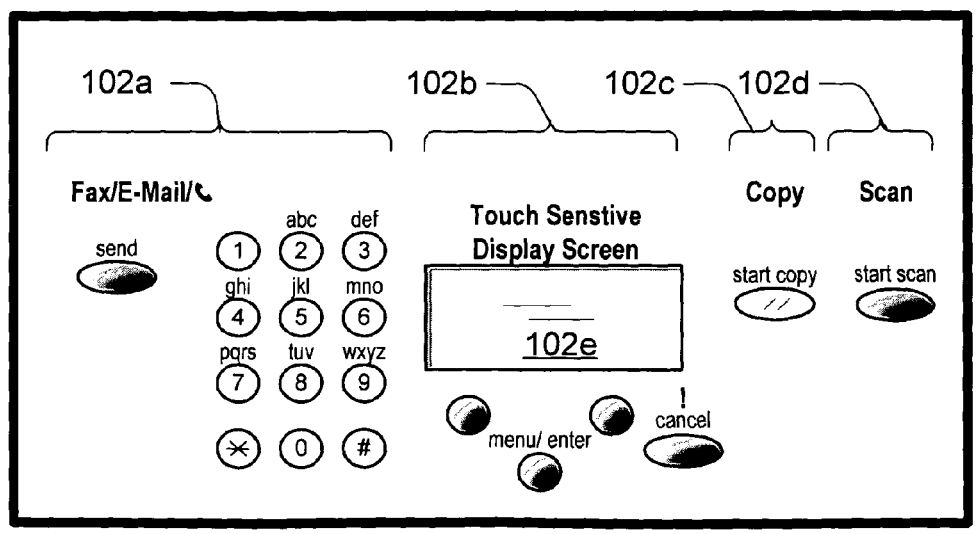

Digital transmitter devices 102-i are generally distinguishable from devices such as desktop PCs (personal computers), laptop PCs, and pocket PCs by their limited purpose and limited user interface or input/output capabilities. For example, FIG. 1b shows a user interface for a digital transmitter device 102-i. The user interface includes various sections of input devices to perform respective functions with the digital transmitter device. Section 102a allows input of alphanumeric strings with respective number keys in order perform input to send a facsimile and/or an e-mail. Section 102b shows a touch sensitive menu screen 102e for receiving input and/or outputting a display of diagnostics and/or status. Various menu buttons are also shown in Section 102b. Section 102c shows a copy start button to make a copy of one or more sheets of optically scanned paper. Section 102d shows a scan button to optically scan one or more pieces of paper. As an alternative to the user interface depicted in FIG. 1b, digital transmitter device 102-i can have a simpler front menu panel with a limited screen space and less input buttons or keys. As another alternative to the user interface depicted in FIG. 1b, digital transmitter device 102-i can have an integrated keyboard (such as a "QWERTY" keyboard) to assist in entering data.

A digital transmitter device 102-i is typically oriented toward performing one general task such as scanning and outputting that which was scanned. By contrast, devices such as desktop, laptop, and pocket PCs often provide multiple and varied means of input/output such as a full screen display, a keyboard, a mouse, speakers, microphones, PCMCIA (Personal Computer Memory Card International Association) slots, portable media drives and the like. These devices are capable of performing multiple functions through executing various software applications such as word processing applications, spreadsheet applications, financial applications, network browsers and network messaging applications.

Various digital transmitter devices 102-i are seen in FIG. 1a, including a facsimile machine 102-3, a multifunctional peripheral machine 102-2 with a printer device that can scan and print out a hardcopy or send an e-mail message with an attached copy of the scanned hardcopy, and a high volume copier 102-1 that includes the capabilities of printing on substrates of varied composition, binding, collating, folding, stacking, stapling, stitching, edge-trimming, and paginating.

Interconnecting network 104 is representative of one or more communication links, either wired or wireless, that are capable of carrying data between server(s) 106-i and other network resources in communication with interconnecting network 104. In certain exemplary implementations, interconnecting network 104 includes a local area network (LAN), a wide area network (WAN), an intranet, the Internet, or other similar network.

Local access to each digital transmitter device 102-i can be provided through an input device, such as a touch sensitive menu screen 210, on each digital transmitter device 102-i. A user may access the input device via an access control process that is initiated by input that is made to a user interface. This input can be a handwritten signature upon a touch sensitive menu screen, a command sequence and/or User ID entered via a keyboard, as well as other means of input.

Input to the user interface can be received in order to specify one or more e-mail addresses and an optional message text for an e-mail message that the user wishes to send. Alternatively, a default e-mail address or a list of selectable e-mail addresses can also be stored at each digital transmitter device 102-i. Each digital transmitter device 102-i has an imaging or scanning mechanism to receive images of an object (e.g., a hardcopy). A document composer component in each digital transmitter device 102-i then composes images of the scanned object, as discussed below. The detection of detectable indicia in the scanned hardcopy is followed by the insertion of various text and/or objects into respective insertion fields corresponding to the detectable indicia. After these insertions, a modified scanned image of the hardcopy is composed as a document. The composed document can then be output by digital transmitter device 102-i. The output can be made by the document being printed out, transmitted by a facsimile to a facsimile telephone number, or sent in a file attached to an e-mail message that is addressed to the input, default, or selected e-mail address(es) from digital transmitter device 102-i through interconnected network 104 to one or more e-mail servers 106-i for the respective e-mail address(es) input or specified by the user.

The user of digital transmitter device 102-i seen in FIG. 1a can transmit message data to interconnected network 104 by a wired or wireless link. A wireless link can be through an Infrared (IR) data connection or other wireless data connections such as the Blue Tooth or 802.11 protocol. The wireless link may be made through radio frequency (RF) or infra-red (IR) data ports. By way of example, digital transmitter device 102-i can include the capabilities of a cordless handset telephone, a cellular telephone, a personal digital assistant (PDA), a pager, a watch and the like, any of which is also capable of transmitting data in a wireless manner. A wired link can be performed through a USB data connection, a serial port connection, a parallel port connection or via other known data transmission standards and modes. The wired link may be implemented through standard category V cable, Universal Serial Bus (USB) cable, or IEEE 1394 (i.link/Lynx/Fire Wire™) connection data ports. As such, digital transmitter device 102-i can transmit by one or both of a wireless or wired link.

Exemplary System for a Digital Transmitting Device in Communication with a Server A system 200 of FIG. 2 includes digital transmitter device 102 as a network resource coupled by a wired or wireless link to interconnecting network 104 and to server 106 through interconnected network 104. As such, FIG. 2 illustrates an embodiment of the system 100 of FIG. 1a in greater detail. In accordance with still further aspects of the present invention, digital transmitter device 102 may be included within a multiple function peripheral (MFP) device 300. As its name implies, the MFP device 300 is configured to provide multiple functions. In this example, the functions provided by the MFP device 300 include those provided by digital transmitter device 102 as well as an optional printer device 310. Consequently, the user of digital transmitter device 102 may also print out a hardcopy of any applicable portions of data stored, scanned or otherwise acquired by digital transmitter device 102.

In general, digital transmitter device 102 uses a controller 250 to execute a program that can be stored in an image composer 217 of a memory 206. Execution of the image composer 217 will compose a document from images that are captured by scanning the document using a scanning mechanism 212. A detection application 216 in memory 206, when executed by controller 250, can be used to detect detectable indicia in an optically scanned image, to determine the size, shape, and location of insertion fields from the detected indicia, and to determine a process for obtaining text to be inserted into each insertion field in the optically scanned image. Alternatively, detection application 216 in memory 206, when executed by controller 250, can be used to process a form template to determine the size, shape, and location of insertion fields therein, and to determine a process for obtaining text to be inserted into each insertion field in the form template.

Digital transmitter device 102 can use controller 250 to execute a program that performs an optical character recognition routine on an optically scanned image that is acquired by use of scanning mechanism 212. The optical character recognition routine forms a softcopy of text of the optically scanned image. The font of the softcopy of text can be substantially matched with respect to text that is adjacent to the insertion field in a softcopy of the document. When so matched, the font-matched text can be inserted into the insertion field of the softcopy of the document. The modified softcopy of the document can then be rendered for output, such as by forming a hardcopy of the modified softcopy of the document.

Depending upon the extent and type of text that is to be inserted into a document, the hardcopy of the modified softcopy of the document might have more or less pages than that of the original unmodified hardcopy. In this case, digital transmitter device 102 can use controller 250 to execute a reflow routine that repaginates the resultant modified softcopy of the document and its corresponding hardcopy. As such, the resultant modified hardcopy will be properly paginated and will have a consistent font appearance at each field into which text had been inserted.

Input that is received from a user of the digital transmitter device, and/or the type and kind of the detected indicia that is detected by the digital transmitter device, can be used by the digital transmitter device as a key to look up corresponding text in a database and file codes storage 220 in memory 206 of digital transmitter device 102 and/or in database and file codes storage 224 in memory 222 of server 106. Any text thus obtained can then be used for any of a variety of purposes. For instance, the input from the user can be a text message, a User ID, a character string, or a sequence of codes that can be looked upon the database and file codes storage 220 for the purpose of obtaining a single email address and/or an e-mail address list.

The detected indicia can be a bar code or invisible ink symbol that can be looked up in the database and file codes storage 220. This look up operation can obtain a corresponding text softcopy. The corresponding softcopy of the text can then be font-matched for substitution into the one or more corresponding insertion fields having adjacent like-font text in a softcopy of an optically scanned hardcopy. As such, the substituted text will take the place of the detected indicia. Other such look ups are also contemplated.

Upon obtaining the text and its proper matching font, the execution of the detection application 216 can also fit, insert, and/or superimpose each such font-matched text into, around, and/or proximal to the corresponding insertion field of the optically scanned image. The image composer 217 can be used to compose a modified optically scanned version of the document containing the inserted font-matched text. This modified optically scanned version of the document can then be output or rendered. Alternatively, the modified optically scanned version of the document can be composed and stored, in full or in part, locally in and/or remotely to scanning mechanism 212.

Controller 250 can execute a program so as to transform data to a driver format suitable for printing with integral, optional printer device 310, such as a mark up language format (e.g. SMGL, HTML, or XML), or such as a job language format (e.g. PCL or POSTSCRIPT®. Printer device 310 can have the capability of converting data and then outputting it onto an appropriate print media, such as paper, transparencies or glossy photo paper.

Digital transmitter 102 includes one or more CPUs 202, each of which is operatively coupled to memory 206, and a user interface that includes an input device. Preferably, the input device will be locally accessible at digital transmitter device 102. By way of example, the input device can be a touch sensitive menu screen 210. Digital transmitter device 102 also includes at least one communication port for interfacing with interconnecting network 104 through either a wired or wireless link.

When included in MFP device 300, CPU(s) 202 would also be operatively coupled to printer device 310, for example. CPU(s) 202 is representative of any hardware, firmware and/or software that is configured to perform certain functions associated with the operation of digital transmitter device 102. Hence, as those skilled in the art will recognize, CPU(s) 202 may include dedicated logic and/or one or more processors configured in accord with software instructions, for example.

Memory 206 is representative of any type of data storage mechanism that can be accessed by at least CPU(s) 202. Memory 206 may therefore include, for example, some form of random access memory (RAM), some form of read only memory (ROM), and/or other like solid-state data storage mechanism. Memory 206 may include a magnetic and/or optical data storage mechanism. Scanning mechanism 212 is representative of any optical scanner technology that may be employed to produce scanned object data upon scanning an object. Such scanning technologies are well known. The resulting scanned object data is provided to CPU 202 and/or stored in memory 206.

Controller 250 of digital transmitter device 102 typically includes data processing unit or CPU 202, a volatile memory 204 (i.e., RAM), and a non-volatile memory 206 (e.g., ROM, Flash). Digital transmitter device 102 also includes a device engine 208. The touch sensitive menu screen 210 acts as a local user interface for digital transmitter device 102 by displaying menu pages and accepting user input based on selectable menu items displayed on the menu pages. The touch sensitive menu screen 210 can be used to display a menu page that asks for and receives the input, such as an e-mail address to which to image data that is scanned with scanning mechanism 212 is to be transmitted in an e-mail message via interconnected network 104.

Controller 250 processes data and manages device functions by controlling device engine 208 and by responding to input from touch sensitive menu screen 210. Device driver software in a device server can be stored in memory 206 and executed on CPU(s) 202. Memory 206 also includes a server module 214 configured to serve menu documents to the touch sensitive menu screen 210. The server module 214 is a local server in the sense that it is present within the same digital transmitter device 102 to which it serves menu documents.

As mentioned above, controller 250 can optionally include a User ID/Signature File and Code component that is stored in the database and file codes storage 220 in memory 206. This User ID/Signature File and Code component would in turn be used to validate a user identification code (User ID) and a corresponding digital representation of a signature for the purpose of ascertaining the access control rights of a user. Alternatively, server 106 can perform this function through a database and file codes storage 224 in memory 222 of server 106.

Menu documents stored in memory 206 can be interpreted by the server module 214 and are configured to display textual and graphical information as menu pages on the touch sensitive menu screen 210. The menu documents driving the menu pages can include script code that is associated with graphical keys. The term "script code" is intended herein to mean any one of a variety of different code types. Various kinds of code are contemplated. By way of example, and not by way of limitation, the code can be implemented in embedded script code, in firmware, in a native code such as C++ code, or can be JAVA script. The code can be written in JavaScript code that is interpreted and executed on a Java Virtual Machine (JVM). The code can also be written in other script code languages such as VBScript or Perl.

Selecting a menu item by pressing a graphical key on the touch sensitive menu screen 210 triggers an event, which causes a "virtual machine" 218 to interpret and execute the script code associated with the selected graphical key. The virtual machine 218 is a software module stored in memory 206 that executes on CPU(s) 202 to interpret and execute script code. The script code can be associated with selectable menu items (i.e., graphical keys or buttons). One menu item is configured to initiate a scan of an image using the scanning mechanism 212. Another menu item can be configured to perform the task of receiving input that includes a User ID, a priority code, and one or more e-mail address (es) to which e-mail message data is to be sent via interconnected network 104. Still another menu item can be configured to perform the task of initiating a retrieval of an e-mail address that was previously stored in memory 206, where memory 206 can optionally contain e-mail address information in the database and file codes storage 220 in memory 206 that can be requested to be displayed upon touch sensitive menu screen 210. When the e-mail address information is retrieved from memory 206, the user can select a displayed e-mail address to which an e-mail message will be transmitted over interconnected network 104 to one or more recipients via server 106-i from the memory 206 of another digital transmitter device 102 as seen in FIG. 1a. Alternatively, the user can directly enter a specific e-mail address into the digital transmitter device 102 using touch sensitive menu screen 210. Controller 250 executes processes resident in a communicative link interface for a transmission (e.g. an e-mail message) that can be transmitted over a wired and/or wireless link to interconnected network 104. These transmitted email messages need not be sent to another digital transmission device 102-i, they may be sent to any device capable of receiving email.

The digital transmitter device can be configured such that the user can enter a command to initiate a scanning operation either before or after the user has obtained sufficient access rights, where the rights are based upon an optional access control check that is performed upon the user's manual input of data and/or a signature at touch sensitive menu screen 210. Prior to the scanning operation, the user places a document into a sheet feeder device associated with digital transmitter device 102. The sheet feeder device then physically feeds each sheet in the document to scanning mechanism 212. Alternatively, the user can place a single sheet or substrate on to a glass platen associated with digital transmitter device 102. CPU(s) 202 process software or other machine executable code stored in image composer 217. The image composer 217 then generates a bit map or other output that is a digital representation of the scanned document in a document composition process. The bit map or other digital representation of the document is examined for the presence of detectable indicia and insertion fields corresponding thereto by execution of the detection application 216 and/or other routines. Text and/or object(s) for each insertion field are obtained as described herein.

Once obtained, the text and/or objects are inserted into their respective insertion fields within the bit map or other output that is a digital representation of the scanned documents. A modified scanned image is then composed by image composer 217. The modified scanned image that is composed includes all insertion fields having the corresponding text and objects inserted therein by way of substitution for the detectable indicia.

Font-matched text can be inserted in respective insertion fields in a variety of ways. For instance, an insertion field can be rendered in the modified scanned image to appear as a water mark of user-specified font, so that the one or more superimpositions do not substantially obscure any portion of the images on the rendered documents. The superimpositions can appear to be integral with the images on the rendered document so that their appearance thereon is easily noticed and could not be easily removed. To further minimize obscuring any portion of the images on the rendered documents, the superimpositions can be situated in a margin or scaled so as to be small relative to the rendered document page size. To do so, the digital transmitter device can be configured, manually or otherwise, to have control over the location and size of the inserted water mark on the rendered documents.

Once the document composition process has digitized the scanned object data with the insertion fields as discussed above, the composed documents can be printed out, sent as a facsimile transmission to a facsimile telephone number specified by the user, and/or sent in an attached file to an e-mail message that is transmitted to an e-mail address(es) specified by the user. Moreover, the image composer 217 of memory 206 can provide the digital transmitter device 102 with the capability of performing a variety of document composition routines for a plurality of data formats. These data formats include an American Standard Code for Information Interchange (ASCII) formatted data format, a word processor format, a spread sheet data format, a Portable Document Format (PDF) data format, a slide show software data format such as the Power Point® software data format from Microsoft Corporation of Redmond Wash., USA, a graphic image file format (GIFF) data format, a tagged image file format (TIFF) data format, a Joint Photographic Experts Group (JPEG) data format, a bit-map data format, an optical character recognition (OCR) data format, and/or other forms of encoded data, including, e.g., encrypted data, etc.

When the user enters a command displayed upon touch sensitive menu screen 210 to enter or retrieve an e-mail address, digital transmitter device 102 coordinates the input of the e-mail address. Controller 250 then executes a user message compositing routine which can be stored in memory 206. The user message compositing routine assembles message data. The message data so assembled can include the e-mail address(es) input or otherwise designated by the user, the bit map or other output that is a digital representation of the modified scanned image, and can also include any message text entered by the user upon touch sensitive menu screen 210. The message data is then sent by a wired and/or wireless link from digital transmitter device 102 to interconnected network 104. From interconnected network 104, a communication is established with an e-mail server 106 as seen in FIG. 1. The e-mail server 106 serves the e-mail address to which the e-mail message from digital transmitter device 102 is to be sent. By way of example server 106 can, but need not, function as the e-mail server of any e-mail address of digital transmitter devices 102-i seen in FIG. 1a. Alternatively, a server in communication with interconnected network 104, other than server 106, can be the e-mail server for e-mail addresses associated with digital transmitter devices 102-i.

CPU(s) 202 is configured to perform the operations described above using various executable modules of memory 206. These executable modules of memory 206 can include an e-mail address storage/retrieval routine, a communicative link interface routine, and a user message compositing routine, any of which can each be implemented in software or firmware.

In one embodiment of the invention, an e-mail address storage/retrieval routine executing on CPU(s) 202 receives input of an e-mail address from a user at touch sensitive menu screen 210 or retrieves a list of stored e-mail addresses by a look up that makes use of the user's input. The list of e-mail addresses can be displayed on touch sensitive menu screen 210 in a hierarchical list. The list can be sorted alpha-numerically. The user can either select from among the displayed e-mail addresses or input the characters of a specific e-mail address using a 'drill-down' function of the menu, as discussed below with respect to FIGS. 3–4. The drill-down menu format and the displayed list of retrieved e-mail addresses assist the user in locating an e-mail address of interest.

FIG. 2 shows server 106 as being in communication with interconnected network 104 and having a processor 232, a volatile memory 234, and memory 222. Memory 222 includes a device driver 228, a server module 230, optionally the database and file codes storage 224 discussed above, and application routines 226 for storage of software or other machine executable code. Application routines 226 are storage locations for programs that can be executed by processor 232 on server 106.

Figure 3:
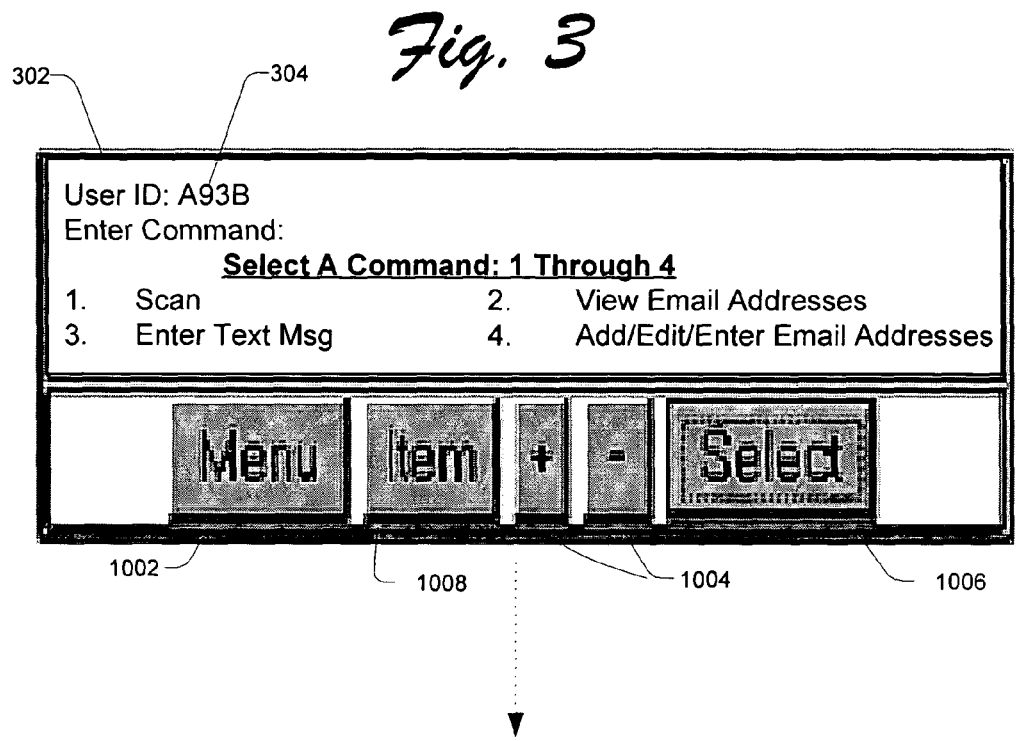
FIGS. 3–4 illustrate an example of sequential menu pages that might be displayed on a touch sensitive menu screen of a digital transmitter device, according to an embodiment of the present invention.
Figure 4:
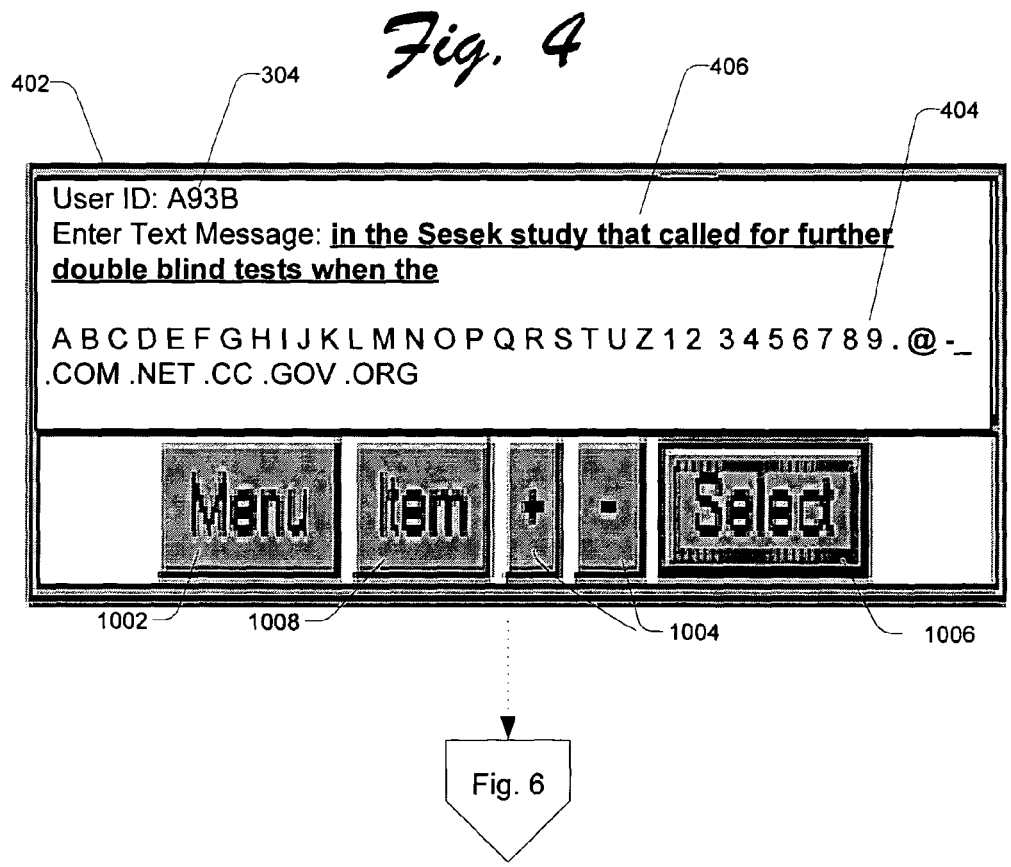
Figure 6:
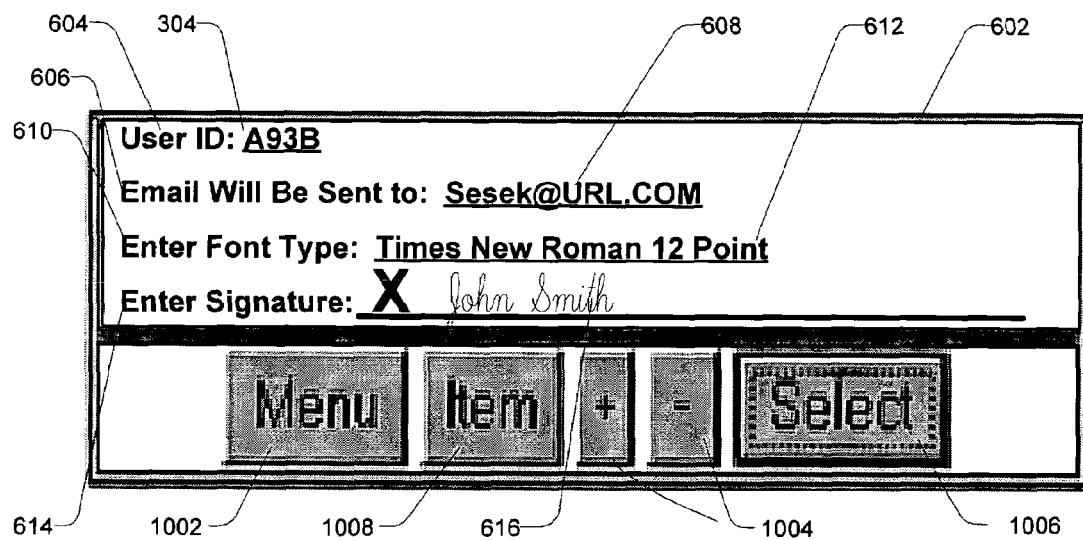
FIG. 6 illustrates an example, according to an embodiment of the present invention, of a menu page that might be displayed on the touch sensitive menu screen of the digital transmitter device in sequence after a transition from the menu page of FIG. 4.

As mentioned in the examples above, but not limited thereto, a user interface device can be used to accept the input of a text insertion (or representation thereof) to be inserted into insertion field, such as by being keyed in at a keyboard by a user of the digital transmitter device. Another input can be an e-mail address that is similarly entered. Still other input can be a handwritten character string that is entered upon at a touch sensitive menu screen, which handwriting is subjected to an optical character recognition routine to derive corresponding text therefrom. By way of example of a user interface, a sequence of menus that can be displayed upon touch sensitive menu screen 210 of digital transmitter device 102 is seen in FIGS. 3, 4 and 6. A menu screen 302 seen in FIG. 3 is displayed upon touch sensitive menu screen 210 of digital transmitter device 102. Menu screen 302 shows various options to be selected by a user of digital transmitting device 102. In the example provided in FIG. 3, a user has already input the character string "A93B" at reference numeral 304 on menu screen 302. This character string 304 can be used for any of a variety of purposes. For instance, the character string 304 can be a User ID that is to be compared against an access control data base to determine if the User ID corresponds to particular use privileges with respect to the digital transmitter device 102. Alternatively, the character string 304 can be a form code that, by the input thereof, is used to identify a form template having one or more predetermined insertion fields. Once the predetermined insertion fields of the form template have been communicated to the digital transmitter device 102, one or more corresponding documents can be scanned by scanning mechanism 212 to form respective optically scanned images. The optically scanned images are subjected to an optical character recognition routine to form respective softcopies of the text therein. These text softcopies can then be font-matched as described above for respective fitting into the one or more predetermined insertion fields in a softcopy of the form template.

When the user selects option "1" on menu screen 302, digital transmitter 102 activates scanning mechanism 212 to scan in documents as discussed above. When the user selected option "3" on menu screen 302, menu screen 402 seen in FIG. 4 is displayed. Menu screen 402 can be used to receive input of text message 406 from the user. The user can directly enter each character of the text message 406 using displayed virtual buttons. Menu screen 402 shows a practical example of a user selecting characters for text message 406. Script code executing in CPU(s) 202 can be used to present menu screen 402. The execution of this script code allows the user to see alphabetic and symbolic characters as the user depresses virtual buttons 1004 so as to move forward and backward through a displayed hierarchical list of available alphabetic and symbolic characters. Script code executes in CPU(s) 202 to enable a user to select a displayed character by depressing virtual button 1006. Output area 406 on menu screen 402 shows that the user has entered various letters and symbols for text message 406. Then, when the "Select" virtual button 1006 is depressed on touch sensitive menu screen 210, as represented by menu screen 402, the user sees a transition to a menu screen 602 in FIG. 6. FIG. 6 shows that the user has keyed the e-mail address Sesek@URL.COM similarly to the entering of the various letters and symbols for text message 406. FIG. 6 also shows that the user has used a stylus to handwrite input on the touch sensitive menu in a signature field at reference numeral 608. Other virtual buttons on the touch sensitive menu screen 210 are also contemplated in order to provide for the initiation of other and/or additional functions by the user, such as a menu virtual item button 1002 seen in FIGS. 3, 4 and 6.

Figure 5:
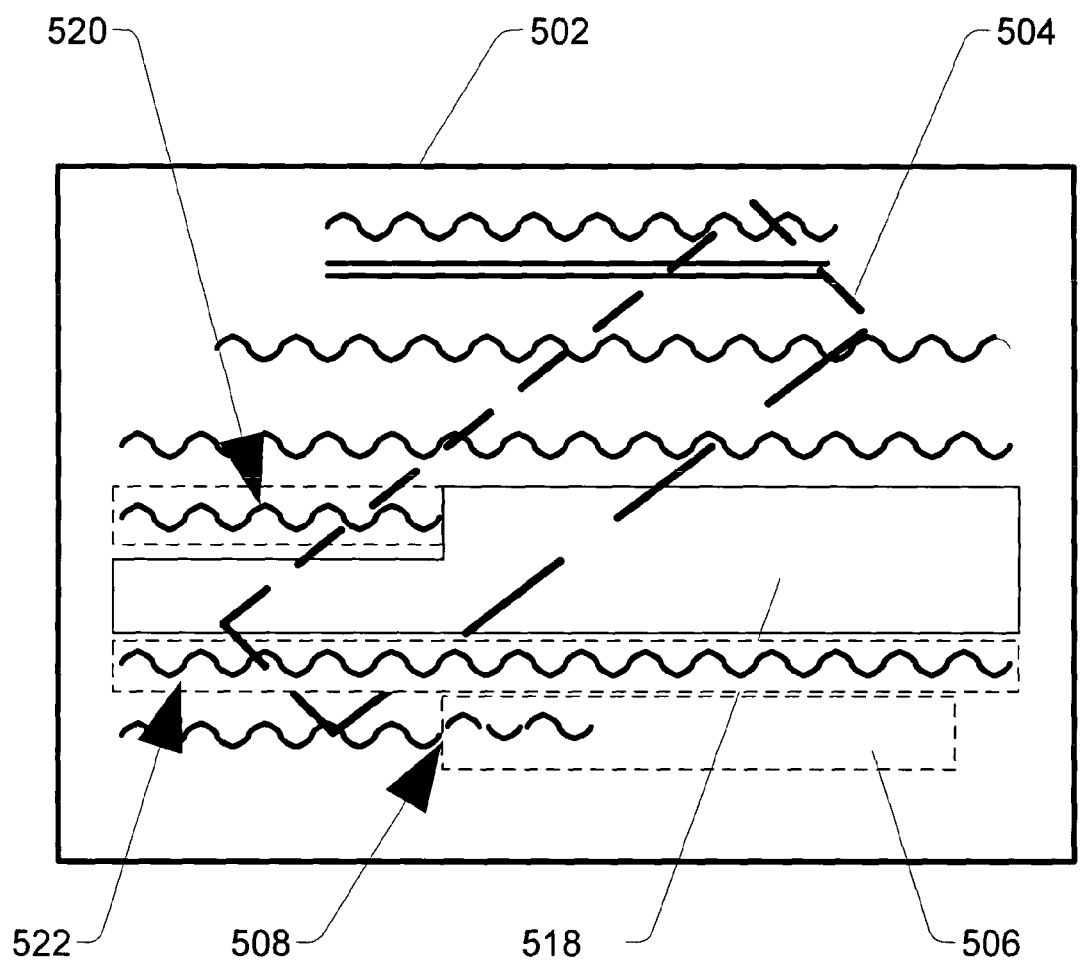
FIG. 5 illustrates an example, according to an embodiment of the present invention, of a paper document to be optically scanned into a scanning mechanism of a digital transmitter device, where the paper document has thereon one or more fields at predetermined positions and/or one or more fields of detectable indicia.

FIG. 5 shows an image 502 that can be a form template containing predetermined insertion fields 504, 506, and 518 into which text is to be inserted. The form template is represented by a softcopy having predetermined insertion fields 504, 506, and 518 therein. Input is received, directly or indirectly, from a user of digital transmitter device 102 that corresponds to the predetermined insertion fields 504, 506, and 518. This input is converted, where needed, into respective softcopies of text corresponding to the predetermined insertion fields 504, 506, and 518. The respective softcopies of the text are then font-matched to the respective text that are adjacent to each of the predetermined insertion fields 504, 506, and 518 in the softcopy of the form template.

FIG. 5 shows an image 502 that can be on a piece of paper. Image 502 includes markings that indicate predetermined insertion fields 504, 506, and 518. A user places the piece of paper in a sheet feeder to be optically scanned with scanning mechanism 212 into digital transmitter device 102. Of course, the image is not required to be on a piece of paper. Rather, the image can be on a substrate or other image-bearing surface. The image 502 seen on the paper has a double underlined heading and has text below the heading. The text below the heading has a font, a case, a line spacing, a text color, a background color, a foreground color, a particular character spacing, certain text effects, an alignment for each line and each paragraph, text shadowing, and text shading. First, second, and third detectable indicia 504, 506, and 518 are seen in the image on paper 502 and are detectable by execution of a detection application 216 upon the optically scanned image by digital transmitter 102. As such, the first, second, and third detectable indicia 504, 506, and 518 can be, for example, bar codes, invisible ink, visible ink, symbols, hole punch sequences, etc.

Phantom lines 520 and 522 indicate text that is adjacent to the predetermined insertion field 518. As such, any text that is to be inserted into the predetermined insertion field 518 should be substantially matched as to the font thereof with respect to the text that is present in the respective regions seen at phantom lines 520 and 522.

Reference numeral 508 points to a portion of the text on image 502 where second detectable indicia 506 overlaps a portion of the text. The digital transmitter device 102 can be configured such that an insertion field corresponding to the second detectable indicia 506 will be shifted in the position thereof such that the text on paper 502 will not be obscured by the filling in of the insertion field corresponding to the second detectable indicia 506. As such, none of the text of image 502 will be cropped or otherwise obscured by inserted text or objects. One routine for performing such a 'no cropping option' is to shift the location of the insertion field corresponding to the second detectable indicia 506 such that the complete periphery around the insertion field is represented only by a white color (e.g., a blank space). This completely white periphery can be detected by detection application 216 in the optically scanned image. Other known routines to avoid obscuring and/or cropping an underlying image with inserted text and objects are also contemplated.

The detection of first, second, and third detectable indicia 504, 506, and 518 can be interpreted by the execution of detection application 216 as an instruction to display a menu screen. The menu screen that is displayed can prompt a user to enter text that is to be inserted, respectively, into fields that correspond to first, second, and third detectable indicia 504, 506, and 518. Thus, each menu screen 402, 602 displays prompts that direct a user to manually enter text. For instance, menu screen 602 features a User ID prompt 604, an email address prompt 606, a font type prompt 610, and a handwriting signature prompt 614. The user responds by entering respective response to which the prompts apply. By way of example, the user enters a User ID as "A93B" at entry field 304 in response to the User ID prompt 604. The user enters an email address at entry field 608 in response to the email address prompt 606. The user enters a font type at entry field 612 in response to the email address prompt 610. The user can also enter a manual signature upon the touch sensitive menu screen 210 at entry field 614 in response to the. The entries for fields 304, 608, 612, and 616 can be entered on touch sensitive menu screen 210. Alternatively, alphanumeric entries at fields 304, 608 and 612 could be made by the user at a keyboard, if available to digital transmitter 102. The User ID "A93B" can be entered at entry field 304 in a way that is similar to that of the text message seen at reference numeral 406 in menu screen 402 of in FIG. 4. The handwritten signature can be entered by using a pen or stylus upon touch sensitive menu screen 210. Alternatively, the pen or stylus can also be used to make other inputs to menu screens 302, 402, and 602 on touch sensitive menu screen 210. As can be seen in menu screen 602, the result of the manually entered signature is displayed at entry field 616.

After input is accepted from the user of menu screen 602, the input can be used to look up text that is to be inserted into the insertion fields that correspond to first, second, and third detectable indicia 504, 506, and 518. The location, size, and shape, and any rule governing the same, can also be looked up for these insertion fields. The text can be found by look ups in one or both of database and file codes storage 220, 224, respectively, at digital transmitter device 102 and server 106.

Figure 7:
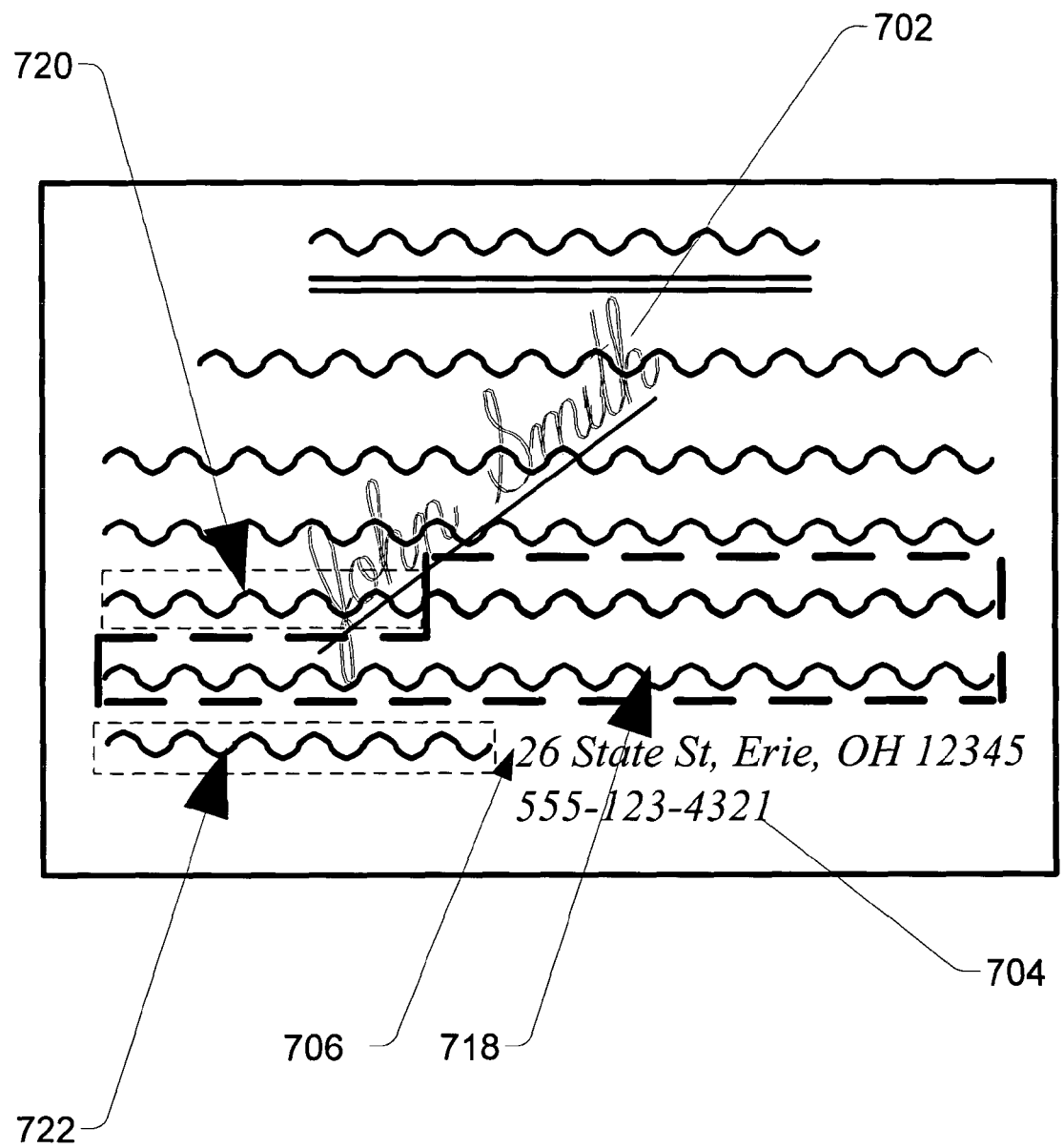
FIG. 7 is a representation of the paper document of FIG. 5 after it has been composed by the digital transmitter device, where one of the fields on the paper document of FIG. 5 has been substituted for a fitted field that includes a manually input signature that is superimposed as a watermark on the paper document, where another field has address and telephone number data fitted therein and situated so as to avoid clipping an adjacent marking on the paper document, and where the textual contents of another field was directly input by a user at a user interface as shown in FIG. 4, according to an embodiment of the present invention.

Once the text is found by the look ups, the text can be inserted, fitted into, or otherwise superimposed into/onto the size and shape of each of the corresponding insertion fields by execution of the image composer 217 and/or the detection application 216. An example of a resultant modified scanned image, having insertions therein, is seen in FIG. 7. The modified scanned image shows a superimposed watermark handwritten signature 702 that has been substituted for the insertion field corresponding to first detectable indicia 504. The superimposed watermark handwritten signature 702 reflects the handwritten signature that was input to menu screen 602 proximal to the reference numeral 608. A look up was performed on the User ID 304 that was entered prior to menu screen 302 to obtain the address data 704 that is seen inserted into an insertion field corresponding to the second detectable indicia 506. Block 718 in FIG. 7 is intended to represent the insertion of the text message 406 that was entered on menu screen 402.

The text in each block 718, 720, and 722 has substantially the same font. The font can be, for instance, specified in entry field 612 response to font type prompt 610 (e.g., Time New Roman 12 Point". Alternatively, the text in each block 718 can be substantially matched to the original font of the text in blocks 720 and 722. The original font of the text in blocks 720 and 722 can be determined by performing an optical character recognition routine on an optically scanned image of the text in blocks 520 and 522 of FIG. 5. As a further alternative, the font of the handwriting at reference numeral 702 can be predetermined or can be as was specified, for instance, in entry field 612 in response to font type prompt 610.

A 'no cropping' option has been used in the resultant modified scanned image in that the address data 704 is shifted to the right so as to avoid obscuring text in the image on the paper proximal to the reference numeral 706 in FIG. 7.

The modified scanned image seen in FIG. 7 can be printed out, sent to the displayed facsimile telephone number 555-123-4321 for rendering, and/or made into a document (e.g., a "*.PDF" file) that can be attached to an e-mail message addressed to the e-mail address "Sesek@URL.COM" specified at reference numeral 606. In transmitting an e-mail message after the foregoing input sequence from a user, digital transmitter device 102 can use the execution of image composer 217 to compose all insertion fields with the scanned document(s) and then assemble message data to be sent in an e-mail message through interconnecting network 104 to the e-mail address(es) that was/were selected or otherwise entered by the user, as discussed above.

Before a user places one or more pieces of paper in a sheet feeder to be optically scanned with a scanning mechanism into a digital transmitter device, one or more such pieces of paper can have an image, an example of which has been discussed above with respect to FIG. 5. After the document composition is performed by the digital transmitter device 102, each rendered page can have a representation such as has been discussed with respect to FIG. 7 where a manually entered signature has been superimposed with an address and facsimile number also inserted into the image.

Whether one or all of the rendered pages are to show the handwritten superimposed entries can be an option that is left to the user who is placing the detectable indicia. Other data can be superimposed by the document composition component of the digital transmitter device, such as the time, date, e-mail address of the sender, etc.

A form code can be input by a user at a touch sensitive menu screen 210 of digital transmitter device 102. The form code corresponds to a form template that is kept as a softcopy in storage. The storage can be local or remote to digital transmitter device 102. As such, the digital transmitter device 102 addresses in particular the situation in which the user wishes to produce a printed document based on a predetermined electronic form or template that includes material, textual or graphic, that has been (or will be) scanned and is then incorporated into the document. The completed document may be printed, faxed, transmitted electronically or stored electronically depending on the desires of the user and the capabilities of the digital transmitter device 102 used to create the completed document. In one implementation, the form template for the document being generated is preferably stored on a hard drive or other memory device of the digital transmitter device 102. The form template, however, may be stored on at server 106 or another network resource and downloaded to the digital transmitter device 102 via network 104.

With the form template that corresponds to a form code in memory, when scanned images are to be inserted into the template, the digital transmitter device 102 can access the form template from the memory and ascertain the front, size and/or position of one or more predefined insertion fields into which the scanned image(s) (and/or input from the user) can be fit. Alternatively, the font, size and other parameters of the one or more predefined insertion fields can be communicated to the digital transmitter device 102 from the server 106 on which a form template is resident. The digital transmitter device 102 can then automatically scan one or more images with scanning mechanism 212 at an appropriate resolution, scale and size. The optically scanned one or more images are then subjected to an optical character recognition routine to derive one or more corresponding text messages. Each text message can then be font-matched to text adjacent to a corresponding predefined insertion field in the form template. Each font-matched text message is inserted into the corresponding predefined insertion field in the form template.

By way of further example, FIG. 5 can be deemed to represent an illustration of a form template 502. As shown in FIG. 5, the form template 502 includes standard elements that remain the same from use to use. These standard elements are exemplified in FIG. 5 by the non-descript areas outside of predefined insertion fields 504, 506, and 518. The predefined form template 502 may also be a dynamic form that includes data items that will be obtained and added each time the form is completed. For example, a dynamic form may include a date or time stamp. The dynamic form may also include a field for data that is pulled from an available data source, for example, the Internet and added to the form, such a price quote for a particular security, etc. Additionally, the exemplary form template 502 seen in FIG. 5 includes predefined insertion fields 504, 506, and 518 into which textual representations of scanned images are to be inserted.

By way of example, a particular form code is input into digital transmitter device 102 that corresponds to form template 502 seen in FIG. 5. Alternatively, the user may be presented with a menu of the form templates existing on the system and prompted to select one of the form templates. This may all be done with user interface device 210 on digital transmitter device 102 or from the server 106. Once the form template is selected by the user, that form template will be retrieved from the memory 206 of the digital transmitter device 102. If the process is being controlled from the server 106, the form template may be downloaded to the digital transmitter device 102 via the connection to network 104. Alternatively, parameters of the one or more predefined insertion fields for which the one or more images are to be scanned may be communicated to the digital transmitter device 102 from the server 106. The digital transmitter device 102 can ascertain the font, number, size and position of one or more predefined insertion fields in the form template for which font-matched text is to be inserted. The user can then begin scanning the images of the handwritten signature and the address data that are to be included in the predefined insertion fields of the form template. The digital transmitter device 102 can prompt the user by displaying a request that the user scan one or more pieces of paper for each of the predefined insertion fields 504, 506, 518 as they are defined in the form template 502. This request may be displayed on the user interface 210 on the digital transmitter device 102. Naturally, the user will be working directly with the digital transmitter device 102 to scan the desired images. However, the prompt(s) may be made with the connected server 106.

The user then sequentially scans data images on one or more pieces of paper, where the images can represent a handwritten character sequence or signature, a text message, and address data. The scanning takes place on the scanning mechanism 212 of the digital transmitter device 102. The digital transmitter device 102 or server 106 may prompt the user when it is ready to scan the next image, if more than one image is to be included in more than one predetermined insertion field in the form template 502. The optically scanned images are each subjected to an optical character recognition routine to derive respective text thereof.

As shown in FIGS. 5, having ascertained the font, size, position and, perhaps, the shape of the predetermined insertion fields 504, 506, 518 into which the scanned images will be placed, the digital transmitter device 102 matches the font of the derived text to the text adjacent to the predetermined insertion fields 504, 506, 518. As such, the text in block 718 substantially matches the font of blocks 720, 722. The digital transmitter device 102 will than electronically output the image seen in FIG. 7 from a modified softcopy in which font-matched text insertions have been made. FIG. 7 shows that fields 702, 704, and 718 have the proportionally correct size and shape corresponding to predefined insertion fields 504, 506, and 518.

The completed document seen in FIG. 7 can be rendered by the digital transmitter device 102 for the user, transmitted as a facsimile, sent in an email attached document file (e.g., a *.PDF format) to an email message, or stored and/or transmitted as an electronic document file. In this way, predefined insertion fields can be fitted with font-matched text derived from scanned images. The text that corresponds to each scanned image can not only be substantially matched to a particular font of text adjacent to a predefined insertion field, but text can also be appropriately sized and, perhaps, shaped automatically. The user need not take time to edit a softcopy of the entire document in order to esthetically fit font-matched text into a predefined insertion field in a form template. If the text corresponding to the scanned image (or its representation) is provided with a shape that does not match the predefined insertion field, the digital transmitter device 102 will preferably size text corresponding to the scanned image to generally fit the predefined insertion field.

Alternatively, the digital transmitter device 102 may rotate text that was derived from an optically scanned image to better accommodate the size and orientation of the corresponding predefined insertion field. Other more sophisticated means of reshaping text derived from optically scanned images may also be employed as understood by those of ordinary skill in the art.

Figure 8:
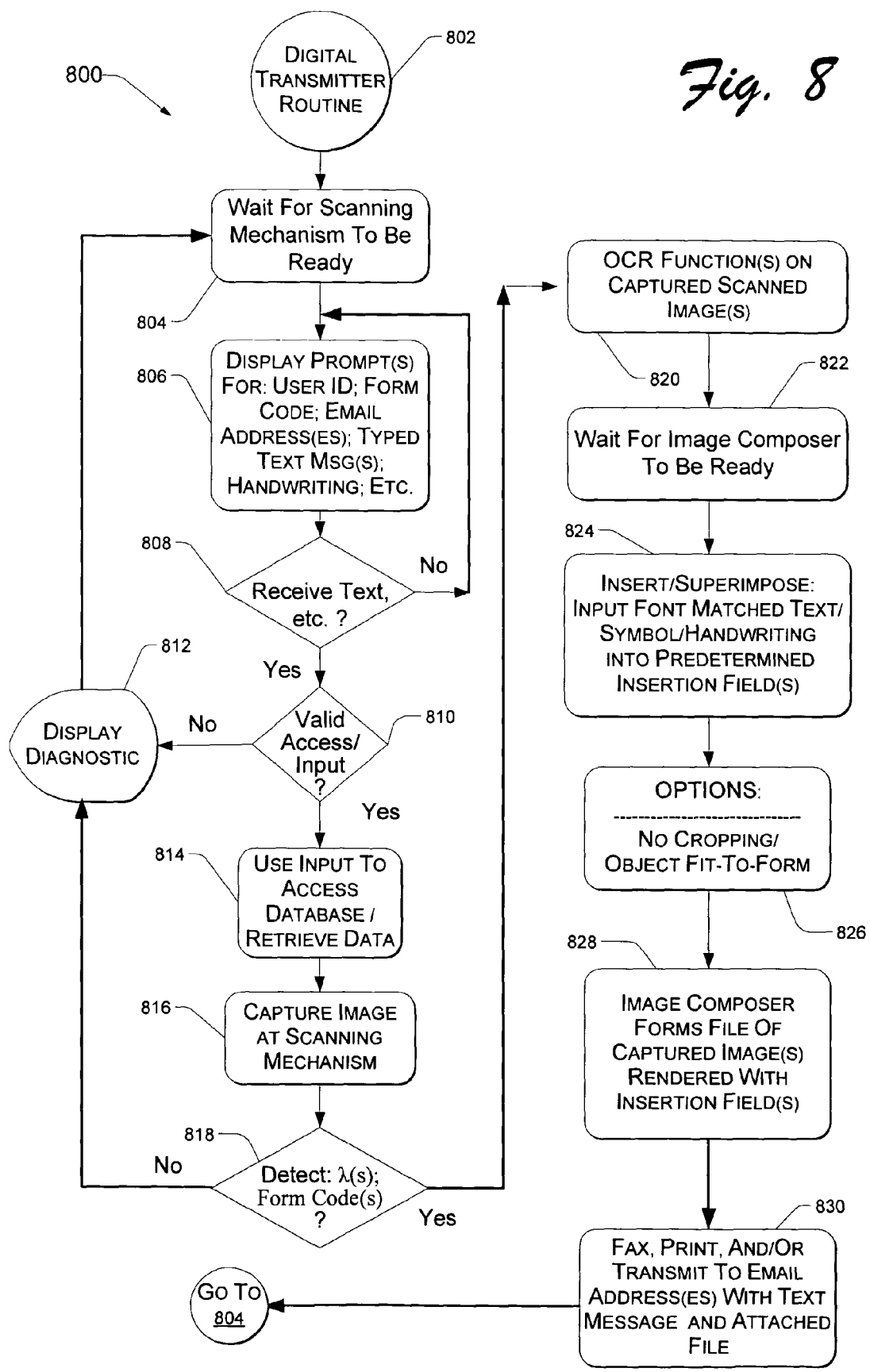

Exemplary Embodiments of Digital Transmitter Device Capture of Substitutions for Predetermined Insertion Fields FIG. 8 shows a flow diagram, according to an embodiment of the present invention, depicting a method for using a digital transmitter device. With this in mind, CPU(s) 202 can be configured to perform the operations described below. By way of further example, the flow diagram is depicted in FIG. 8 to illustrate certain exemplary functions that can be performed using CPU(s) 202 and the other resources in digital transmitter device 102. Here, a process 800 is provided.

FIG. 8 shows process 800 beginning at step 802 which directs a process flow to step 804. At step 804, process 800 waits for the scanning mechanism 212 of the digital transmitter device 102 to be ready to perform a scanning operation. When the scanning mechanism 212 is ready, the process 800 moves control to step 806. At step 806, the digital transmitter device 102 displays one or more prompts upon touch sensitive menu screen 210. In order to display the prompt, the server module 214 of memory 206 in digital transmitter device 102 can serve a menu page that is stored in memory 206 to CPU 202 for execution of script code. The script code being executed by CPU 202 effects a function to be performed by digital transmitter device 102, such as receiving input from a user that is entered upon touch sensitive menu screen 210, or the initiation of a function by the user depressing a function related virtual button that is displayed upon touch sensitive menu screen 210. The script code will preferably be executed in conjunction with an interpretation of the menu page. Note that in certain implementations, the menu page can be directly interpreted by script code executing on CPU 202 without any prior storage in menu documents in memory 206 or use of server module 214 in digital transmitter device 102.

The prompts displayed at step 806 can direct a user to enter various inputs upon a user interface to the digital transmitter device. By way of example, such a user interface could be touch sensitive menu screen 210 of digital transmitter device 102 as seen in FIG. 2. The input can be entries that include a text message, a User ID, a handwritten string of characters, and/or a form code, as discussed above.

After the entries of the user are accepted, the entries are queried at step 808. At step 808, it can be determined whether or not the user has made required input to the user interface. If the user has not made the required input to the user interface, then the process 800 passes control to back to step 806. If, however, the user has made the required input using the user interface at step 806, then the process moves to step 810. Alternatively, the first of a series of prompts at step 806 can require the user to enter a form code. The form code can be used to look up a form template. The form template can be retrieved and found to have one or more predetermined insertion fields therein. For instance, a user can enter a form code which, when looked up in a forms specification table, file or other logical structure, retrieves the form template and identifies specific locations therein that correspond to one or more predetermined insertion fields. By way of non-limiting example, this lookup can find that predetermined insertion fields 504, 506, and 518 in a form template that has the appearance at reference numeral 502. Further on in step 806, additional prompts can be displayed. Each such addition prompt can direct the user to enter text that is to be inserted into a corresponding one of the predetermined insertion fields in the form template.

Process 800 then moves to step 810 where an access control check and/or validity of the input data is tested. By way of example, the User ID 304 entered prior to the menu 302 seen in FIG. 3 can be queried against the database and file code storage 220 and/or 224 of either digital transmitter device 102 or server 106. This query can be used, for example, as access control check that determines whether or not the input User ID matches a valid access record. Other access control routines can also be used. If the access control check results in a denial of access (e.g., other than a positive result from the access control check), then a diagnostic message or error code is displayed to the user on the user interface at step 812 and the process 800 returns control to step 804. Other alternatives for a denial of access are contemplated. The digital transmitted device 102 can be disabled as to further access, and/or an alert message can be transmitted from the digital transmitter device 102 with or without a rendering of the manually input signature being attached to the message. If access is permitted, then process 800 proceeds to step 814.

When various acceptable inputs are made by the user, step 814 uses the input to access one or more databases so as to retrieve corresponding data. These data can be the font, size, shape and characteristics of predetermined insertion fields of a form template. Other data that can be retrieved is one or more e-mail addresses in a distribution list and/or an optional text message to be sent with an e-mail message. By way of example and not by way of limitation, database and file codes storage 220, 224, respectively at the digital transmitter device 102 and at the server 106, can be used to retrieve these data.

Process 800 then passes control to step 816 where the scanning mechanism scans in the document for storage as an optically scanned image at the digital transmitter device. At step 818, the execution of detection application 216 locates detectable indicia in the optically scanned image of the document as discussed above. When an insufficient detection results, process 800 displays corresponding diagnostics at step 812 and return is made to step 804. A form code can be derived, by predetermined criteria, from an optically scanned image that is acquired from the scanning at step 816, or by a user entering the form code at step 806. The form code can be used at step 806-808 or at steps 816-818 to retrieve a form template and its corresponding predetermined insertion fields.

As discussed above, predetermined insertion fields can be determined for a form template or by detection of detectable indicia in an optically scanned page. Once the predetermined insertion fields are known, text can be retrieved and font-matched to text adjacent to the predetermined insertion fields. These font-matched text can then be correspondingly inserted into the predetermined insertion fields. The text that is to be font-matched and inserted can be retrieved in a variety of ways, including by the user inputting same at block 806 or by the user scanning a paper to obtain an optical image from which the text is derived by an optical character recognition routine at steps 816-818.

After step 818 acceptably locates the detectable indicia in the optically scanned image, or acceptably locates the form code, process 800 passes control to step 820. If the location is not acceptable, process 800 moves to step 812 for displaying a diagnostic before returning to step 804. At step 820, an optical character recognition routine is performed on optically scanned images, if any, that were captured at step 816. The optical character recognition routine derives text from the optically scanned images.

Process 800 waits at step 822 for the image composer component 217 and/or CPU(s) 202 of the digital transmitter device 102 to be ready to compose a document. Image composer component 217 of digital transmitter device 102 can be used, in conjunction with scanning mechanism 212, to maintain data and/or algorithms, software, firmware, or other process control means for composing a document from a softcopy therefrom and into which text has been inserted at predetermined insertion fields. The softcopy of the document can be obtained at the digital transmitter device, such as by performing an optical character recognition routine on an optically scanned document. Alternatively, the softcopy can be retrieved from a storage location such as a location at which softcopies of form templates are stored.

After step 822, the digital transmitter device 102 is prepared to compose a document. Process 800 then proceeds to step 824. At step 824, the execution of image composer component 217 and/or detection application 216 of the digital transmitter device 102 performs a font-matching routine on the text that is to be inserted into predetermined insertion fields, as described above. The font-matched text is then correspondingly inserted into respective predetermined insertion fields in a softcopy of the document. These insertions can include superimposing text, symbols, and/or handwriting into the predetermined insertion fields that were determined as described above by the execution of detection application 216.

The completion of the predetermined insertion fields is made by a step 826 that permits various options. Once such option permits the digital transmitter device 102 to be configured so as to permit or prevent one or more specific insertion fields from cropping the underlying portion of the optically scanned document, as disclosed above (e.g., the 'no cropping' option). As a further option, the size and/or shape of the derived text and their corresponding predetermined insertion fields can be adjusted to fit one another within the given size and shape of an optically scanned document.

After optional step 826, process 800 performs step 828 through the execution of the image composer 217 by digital transmitter device 102. The execution of the image composer 217 composes the softcopy document so as to include therein one or more font-matched text strings that were input, retrieved, and/or derived for insertion into (e.g., substituted in the place of) the one or more predetermined insertion fields, thereby producing a modified softcopy of the document. At step 830, the modified softcopy of the document can be output (e.g., rendered) by printing, facsimile transmission, or by one or more e-mail messages that are assembled and transmitted to the e-mail address(es) input or otherwise specified by the user at step 806. Attached to each e-mail message is a file containing a digital rendering of the document. Alternatively, the user may be permitted an option at step 830 to preview the document with insertions prior to the output thereof. After the step 830, process 800 returns to step 804 to repeat the foregoing procedure.

FIG. 9 shows a flow diagram, according to another embodiment of the present invention, depicting a method for using a digital transmitter device. With this in mind, CPU(s) 202 can be configured to perform the operations described below. By way of further example, the flow diagram depicted in FIG. 9 illustrates certain exemplary functions that can be performed using CPU(s) 202 and the other resources in digital transmitter device 102. Here, a process 900 is provided. Steps in process 900 have functional similarities to the steps in process 800, although set forth in a different sequence, as will be discussed below.

FIG. 9 shows process 900 beginning at step 902 which directs a process flow to step 904. At step 904, process 900 waits for the scanning mechanism 212 of the digital transmitter device 102 to be ready. If so, the process 900 moves control to step 906 where the scanning mechanism 212 scans in one or more pages (e.g., a document) for storage at the digital transmitter device as an optically scanned image. Step 908 calls for the execution of detection application 216 to locate detectable indicia in the optically scanned image of the document as discussed above. When an insufficient detection results, process 900 displays corresponding diagnostics at step 910 and then terminates. Alternatively, the detection application 216 can be configured to terminate after a diagnostic display at step 916 when it has been determined that a form code has not been detected in the optically scanned image captured at step 906 or entered at step 912. As such, the form code can be entered in response to a prompt for same at step 912. A form code can be processed similarly to what has been discussed above with respect process 800 of FIG. 8 so as to identify both a form template and its corresponding one or more predetermined insertion fields into which font-matched text is to be inserted.

When the location of the one or more predetermined insertion fields have been determined at step 908, as more fully described above, the digital transmitter device 102 displays prompts upon touch sensitive menu screen 210. There can be one or more prompts corresponding to each of the one or more predetermined insertion fields. As discussed above, each predetermined insertion field is to have font-matched text inserted therein. The font-matched text can be input by the user, such as by a scanning operation with scanning mechanism 212, by directly entering the text with a keyboard, or by other input device associated with digital transmitter device 102. Any such text is matched as to the font thereof, or vice a versa, to the font of text that is adjacent to the predetermined insertion field into which the text is to be inserted. When the text to be inserted has been derived from a scanning operation, the resultant optically scanned image is subjected an optical character recognition routine to derive the corresponding text, as discussed above.

Input from a user is tested for access control and for validity at step 914, similar to step 810 in FIG. 8. Non-access or invalidity results in a diagnostic display at step 916 and a termination of process 900 at step 910. When the result of the input and access control testing proves to be positive, process 900 moves to step 918 which is functionally similar to step 814 of FIG. 8. After step 918, process 900 moves through steps 920–930 that are functionally similar to steps 820–830 of FIG. 8. After step 930, process 900 returns to step 904 to repeat the foregoing procedure.

The foregoing Detailed Description has set forth an example of transmitting an e-mail message from a digital transmitter device. Embodiments of the present invention contemplate other types of data that can also be addressed and transmitted from a digital transmitter device to an electronic address, including those now known and those yet to be developed. As such, and in addition to an e-mail transmission, embodiments of the present invention include a transmission from a digital transmitter device to an electronic address that includes an address of a network resource on a network and a destination location thereat. By way of example, and not by way of limitation, the electronic address can be a file folder address at a server on a network and can also be a Web site address at a server on a network.

Although some implementations of the present invention have been illustrated in the accompanying Drawings and described in the foregoing Detailed Description, it will be understood that the present invention is not limited to the exemplary implementations disclosed, but is capable of numerous rearrangements, modifications and substitutions without departing from the spirit of the invention as set forth and defined by the following claims.

What is claimed is:

1. A computer-readable medium having stored thereon computer-executable instructions which, when executed on one or more processors of a digital transmitter device, direct the digital transmitter device to perform steps of a method at the digital transmitter device, wherein the steps comprise:
   optically scanning a substrate to form a digital image;
   performing optical character recognition on the digital image to form a document having a word processing format, wherein the document includes text that is adjacent to predetermined indicia;
   receiving a text input;
   substituting the text input for the predetermined indicia in the document such that both the text input and the text adjacent to the predetermined indicia have substantially the same font; and
   outputting a rendering of the document.

2. The computer-readable medium as defined in claim 1, wherein the steps further comprise automatically shaping said text input in accordance with a shape of said text that is adjacent to predetermined indicia.

3. The computer-readable medium as defined in claim 1, wherein the steps further comprise repositioning, reformatting, reshaping or resizing elements of said text that is adjacent to predetermined indicia in accordance with a predetermined position of the text input and a size of the text input.

4. The computer-readable medium as defined in claim 1, wherein the steps further comprise repositioning, reformatting, reshaping or resizing elements of the text input in accordance with a predetermined position of the text that is adjacent to predetermined indicia and a size of the text that is adjacent to predetermined indicia.

5. The computer-readable medium as defined in claim 1, wherein the receiving a text input further comprises receiving the text input at a user interface.

6. The computer-readable medium as defined in claim 5, wherein the receiving a text input further comprises outputting a prompt for the text input at the user interface.

7. The computer-readable medium as defined in claim 6, wherein the outputting a prompt for the text input at the user interface further comprises determining the prompt for the text input by performing a lookup function using the predetermined indicia.

8. The computer-readable medium as defined in claim 1, wherein the predetermined indicia is in the substrate and exhibit a predetermined range of reflectance values that are used to determine the location of the predetermined indicia in the document.

9. The computer-readable medium as defined in claim 8, wherein the predetermined range of reflectance values is detectable in the substrate when the substrate is illuminated by light having a predetermined range of wavelengths.

10. The computer-readable medium as defined in claim 1, wherein the predetermined indicia is in the substrate and includes a bar code used to determine the location of the predetermined indicia in the document.

11. The computer-readable medium as defined in claim 1, wherein the receiving a text input at a user interface further comprises:

optically scanning a second substrate to form a second digital image;
performing optical character recognition on the second digital image to form the text input.

12. The computer-readable medium as defined in claim 11, wherein the optically scanning a second substrate to form a second digital image further comprises outputting a prompt for the text input at a user interface.

13. The computer-readable medium as defined in claim 12, wherein the outputting a prompt for the text input at the user interface further comprises determining the prompt for the text input by performing a lookup function with the predetermined indicia.

14. The computer-readable medium as defined in claim 1, wherein the substituting further comprising:
    determining the font of at least one of the text input and the text adjacent to the predetermined indicia; and
    changing the font of either the text input or the text in the document that is adjacent to the predetermined indicia to be that of the determined font.

15. The computer-readable medium as defined in claim 1, wherein the substituting further comprising changing the font of both the text input and the text adjacent to the predetermined indicia to be substantially the same font.

16. The computer-readable medium as defined in claim 1, wherein the substituting further comprising esthetically arranging the text input in-line with the text adjacent to the predetermined indicia.

17. The computer-readable medium as defined in claim 1, further comprising receiving a font selection at the user interface, wherein the substituting further comprising substantially matching the font of the text input and the text adjacent to the predetermined indicia to that of the font selection.

18. The computer-readable medium as defined in claim 17, wherein the receiving a font selection at the user interface further comprises:
    determining the font of the text adjacent to the predetermined indicia;
    outputting a display at the user interface that:
        identifies the font of the text adjacent to the predetermined indicia; and
        prompts for the font selection.

19. The computer-readable medium as defined in claim 1, wherein the substrate includes the predetermined indicia.

20. The computer-readable medium as defined in claim 1, wherein the output of the rendering of the document is selected from the group consisting of a print out, a facsimile transmission, and an e-mail message.

21. The computer-readable medium as defined in claim 1, wherein the substantially the same font comprises one or more textual characteristics that are selected from the group consisting of case, line spacing, text color, background color, foreground color, character spacing, text effects, alignment, shadowing, and shading.

22. A method of producing a document with a digital transmitter device, wherein the document includes a form template that incorporates a scanned image into a predefined insertion field, the form template or parameters of said form template being stored in or accessible to said digital transmitter device, the form template having a word processing format and including text that is adjacent to the predefined insertion field, the method comprising:
    scanning an image for inclusion in said form template to form a digital image;
    performing optical character recognition on the digital image to form a text input;
    substituting the text input in the form template for the predefined insertion field such that both the text input and the text that is adjacent to the predefined insertion field have substantially the same font; and
    outputting a rendering of the document.

23. The method as defined in claim 22, further comprising automatically shaping the text input in accordance with a shape of the text that is adjacent to the predefined insertion field.

24. The method as defined in claim 22, further comprising repositioning, reformatting, reshaping or resizing elements of the text that is adjacent to the predefined insertion field in accordance with a predetermined position of the text input and a size of the text input.

25. The method as defined in claim 22, further comprising repositioning, reformatting, reshaping or resizing elements of the text input in accordance with a predetermined position of the text that is adjacent to the predefined insertion field and a size of the text that is adjacent to the predefined insertion field.

26. The method as defined in claim 22, wherein the substituting further comprising esthetically arranging the text input in-line with the text that is adjacent to the predefined insertion field.

27. The method as defined in claim 22, wherein the predefined insertion field includes a bar code used to determine the location of the predefined insertion field in the form template.

28. The method as defined in claim 22, wherein the substituting further comprising:
    determining the font of at least one of the text input and the text adjacent to the predefined insertion field; and
    changing the font of either the text input or the text in the document that is adjacent to the predefined insertion field to be that of the determined font.

29. The method as defined in claim 22, wherein the substituting further comprising changing the font of both the text input and the text adjacent to the predefined insertion field to be substantially the same font.

30. The method as defined in claim 22, wherein the outputting a rendering of the document is selected from the group consisting of a print out, a facsimile transmission, and an e-mail message.

31. The method as defined in claim 22, wherein the substantially the same font comprises one or more textual characteristics that are selected from the group consisting of case, line spacing, text color, background color, foreground color, character spacing, text effects, alignment, shadowing, and shading.

32. The method as defined in claim 22, further comprising receiving a font selection at a user interface, wherein the substituting further comprising substantially matching the font of the text input and the text adjacent to the predefined insertion field to that of the font selection.

33. The method as defined in claim 32, wherein the receiving a font selection at the user interface further comprises:
    determining the font of the text adjacent to the predefined insertion field;
    outputting a display at the user interface that:
        identifies the font of the text adjacent to the predefined insertion field; and
        prompts for the font selection.

34. The method as defined in claim 22, further comprising outputting a prompt for the text input.

35. The method as defined in claim 34, wherein the outputting a prompt further comprises determining the prompt for the text input by performing a lookup function using the predefined insertion field.

36. A digital transmitter device comprising:
   means for optically scanning a substrate to form a digital image;
   means for performing optical character recognition on the digital image to form a document having a word processing format, wherein the document includes text that is adjacent to predetermined indicia;
   means for receiving a text input;
   means for substituting the text input for the predetermined indicia in the document such that both the text input and the text adjacent to the predetermined indicia have substantially the same font; and
   means for outputting a rendering of the document.

37. The digital transmitter device as defined in claim 36, further comprising means for locating a portion of the digital image corresponding to the predetermined indicia, wherein the portion exhibits a predetermined range of reflectance values.

38. The digital transmitter device as defined in claim 37, wherein:
   the predetermined range of reflectance values is detectable at the portion when the portion is illuminated by light having a predetermined range of wavelengths; and
   the digital transmitter device further comprises means for illuminating the substrate with light having the predetermined range of wavelengths.

39. The digital transmitter device as defined in claim 36, further comprising means for locating a portion of the digital image corresponding to the predetermined indicia, wherein the portion includes a bar code.

40. The digital transmitter device as defined in claim 39, wherein the bar code is used to determine the location of the predetermined indicia in the document.

41. The digital transmitter device as defined in claim 36, wherein the means for outputting further comprises means for forming a network message to be transmitted, wherein the network message includes the digital image and is addressed to an electronic address including an address of a network resource and a destination location thereat.

42. A digital transmitter device for producing a document based on a form template that incorporates a scanned image and that has a word processing format, the digital transmitter device comprising:
   a processor;
   an optical scanner controlled by said processor; and
   a memory unit accessible to said processor in which a program and the form template or parameters of said form template are stored, said form template including text that is adjacent to a predetermined insertion field;
   wherein said processor executes the program to:
      control the scanner to scan an image to form a digital image;
      performing optical character recognition on the digital image to form a text string having a word processing format;
      substituting the text string for the predetermined insertion field such that both the text string and the text adjacent to the predetermined insertion field have substantially the same font; and
      output a rendering of the document.

43. The digital transmitter device as defined in claim 42, wherein the output rendering of the document comprises a network message to be transmitted, wherein the network message includes the digital image and is addressed to an electronic address including an address of a network resource and a destination location thereat.

44. The digital transmitter device as defined in claim 42, wherein the substituting further comprises:
   determining the font of at least one of the text string and the text adjacent to the predetermined insertion field; and
   changing the font of either the text string or the text adjacent to the predetermined insertion field to be that of the determined font.

45. The digital transmitter device as defined in claim 42, wherein the substituting further comprises changing the font of both the text string and the text adjacent to the predetermined insertion field to be substantially the same font.

46. The digital transmitter device as defined in claim 42, wherein the substituting further comprises esthetically arranging the text input in-line with the text adjacent to the predetermined indicia.

47. The digital transmitter device as defined in claim 42, wherein the processor further executes the program to receive a font selection at a user interface, wherein the substituting further comprises substantially matching the font of the text string and the text adjacent to the predetermined insertion field to that of the font selection.

48. The digital transmitter device medium as defined in claim 47, wherein the receiving of the font selection at the user interface further comprises:
   determining the font of the text adjacent to the predetermined insertion field; and
   outputting a display at the user interface that:
      identifies the font of the text adjacent to the predetermined insertion field; and
      includes a prompt for the font selection.

49. A digital transmitter device comprising:
   one or more processors;
   an optical scanner controlled by said one or more processors; and
   a memory unit accessible to said one or more processors in which a program is stored, wherein the one or more processors execute the program to:
      control the optical scanner to optically scanning a substrate to form a digital image;
      perform optical character recognition on the digital image to form a document having a word processing format;
      detect in the document:
         predetermined indicia; and
         text with a font that is adjacent to adjacent to the predetermined indicia;
      receive a text input having a font at a user interface;
      substitute the text input for the predetermined indicia in the document such that both the text input and the text adjacent to the predetermined indicia have substantially the same font; and
      output a rendering of the document.

50. The digital transmitter device as defined in claim 49, wherein the one or more processors further execute the program to automatically shape said text input in accordance with a shape of said text that is adjacent to predetermined indicia.

* * * * *

UNITED STATES PATENT AND TRADEMARK OFFICE
CERTIFICATE OF CORRECTION

PATENT NO. : 7,221,800 B2
APPLICATION NO. : 10/652003
DATED : May 22, 2007
INVENTOR(S) : Robert Sesek et al.

It is certified that error appears in the above-identified patent and that said Letters Patent is hereby corrected as shown below:

In column 28, line 50, in Claim 49, delete "adjacent to" before "the".

Signed and Sealed this

Eleventh Day of August, 2009

David J. Kappos
*Director of the United States Patent and Trademark Office*